(12) United States Patent
Roberts

(10) Patent No.: US 6,332,519 B1
(45) Date of Patent: Dec. 25, 2001

(54) ROLLING-ELEMENT CLUTCH ASSEMBLY

(75) Inventor: John Edward Roberts, Los Altos, CA (US)

(73) Assignee: General Dynamics Government Systems, Mountain View, CA (US)

(*) Notice: Subject to any disclaimer, the term of this patent is extended or adjusted under 35 U.S.C. 154(b) by 0 days.

(21) Appl. No.: 09/634,519

(22) Filed: Aug. 8, 2000

Related U.S. Application Data

(62) Division of application No. 09/206,618, filed on Dec. 7, 1998.

(51) Int. Cl.[7] .................................................. F16D 41/061
(52) U.S. Cl. ........................ 192/45; 192/46; 192/110 B
(58) Field of Search ............................. 192/45, 41 R, 192/46, 45.1

(56) References Cited

U.S. PATENT DOCUMENTS

| | | | |
|---|---|---|---|
| 382,637 | 5/1888 | Curtis | 192/45 |
| 2,232,090 | 2/1941 | Anderson et al. | 192/45 |
| 2,307,881 | 1/1943 | Dodge | 192/45 |
| 3,006,447 | 10/1961 | Irwin | 192/45 |
| 5,004,083 * | 4/1991 | Lohman | 192/46 X |
| 5,109,964 | 5/1992 | Fukui et al. | 192/45 |
| 5,449,057 | 9/1995 | Frank | 192/45 |
| 5,518,093 | 5/1996 | Hartig et al. | 192/45 |
| 5,573,094 | 11/1996 | Roberts | 192/45 |
| 5,642,796 | 7/1997 | Tabe | 192/45 |
| 5,672,110 * | 9/1997 | Kurita et al. | 192/45 X |
| 6,173,824 * | 1/2001 | Roberts | 192/45 |
| 6,186,298 * | 2/2001 | Wake | 192/45 X |

* cited by examiner

*Primary Examiner*—Charles A Marmor
*Assistant Examiner*—Saúl Rodriguez
(74) *Attorney, Agent, or Firm*—Jenner & Block, LLC

(57) ABSTRACT

A rolling-element clutch assembly including a first race member, a second race member and a plurality of rolling elements. The first race member defines a first race surface having a first ratchet surface portion. The second race member defines a second race surface having a second ratchet surface portion. The first race surface and the second race surface define a raceway therebetween. A plurality of rolling elements are disposed in the raceway. The rolling elements provide rolling support between the first race member and the second race member when the first race member moves in a first direction relative to the second race member. At least one of the plurality of rolling elements engages the first and second ratchet surface portions when the first race member moves in a second direction relative to the second race member. The engagement of the rolling element with the first and second ratchet surfaces impedes relative motion between the first race member and the second race member, thereby providing load transmission capability. The profile of each sawtooth incline may be formed from one or more flat planes. A rolling element separator may be provided, the separator allowing the rolling elements to freely roll when the first race member moves in a first direction relative to the second race member and to freely pivot into engagement with or disengagement from the ratchet surfaces when the first race member moves in a second direction relative to the second race member.

8 Claims, 27 Drawing Sheets

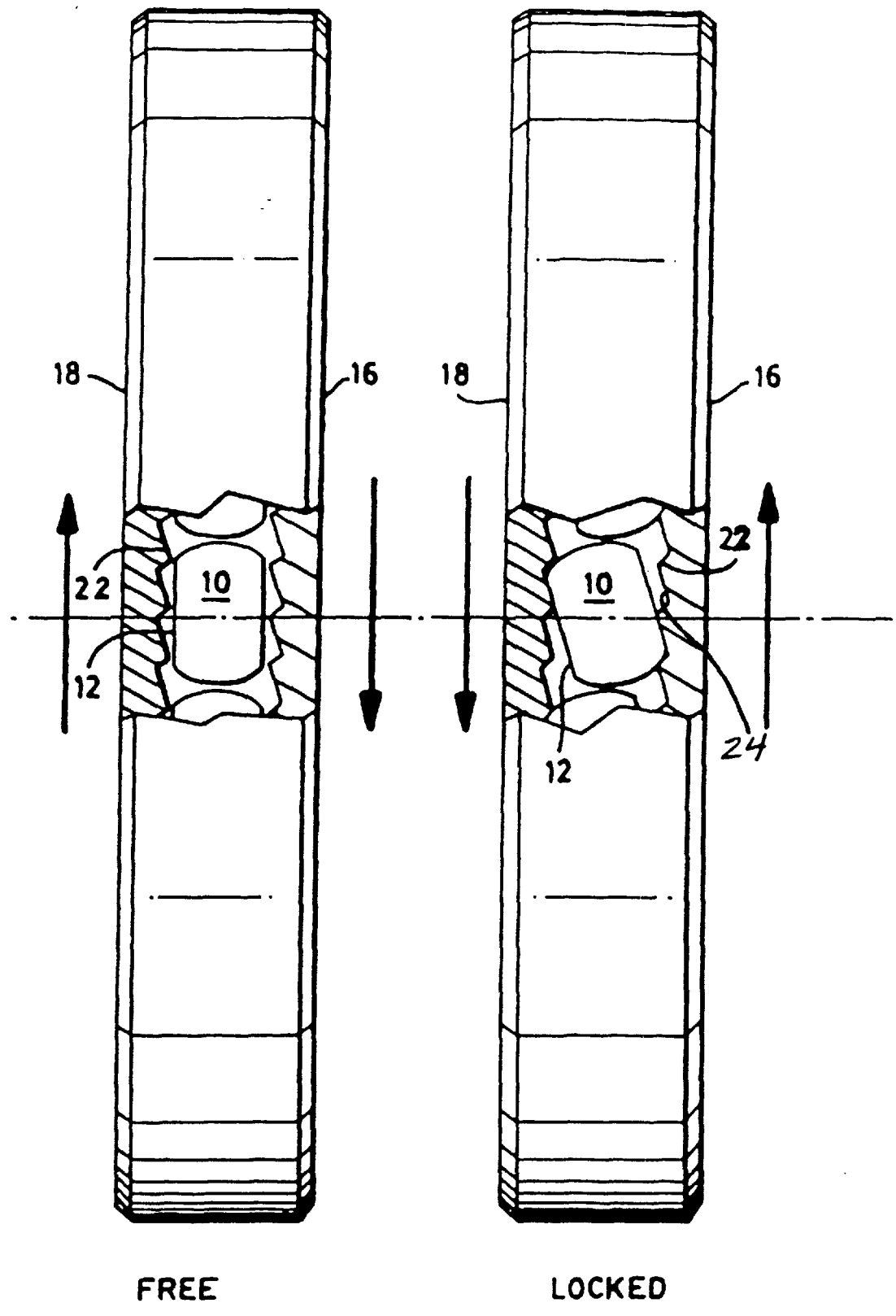

FREE

LOCKED

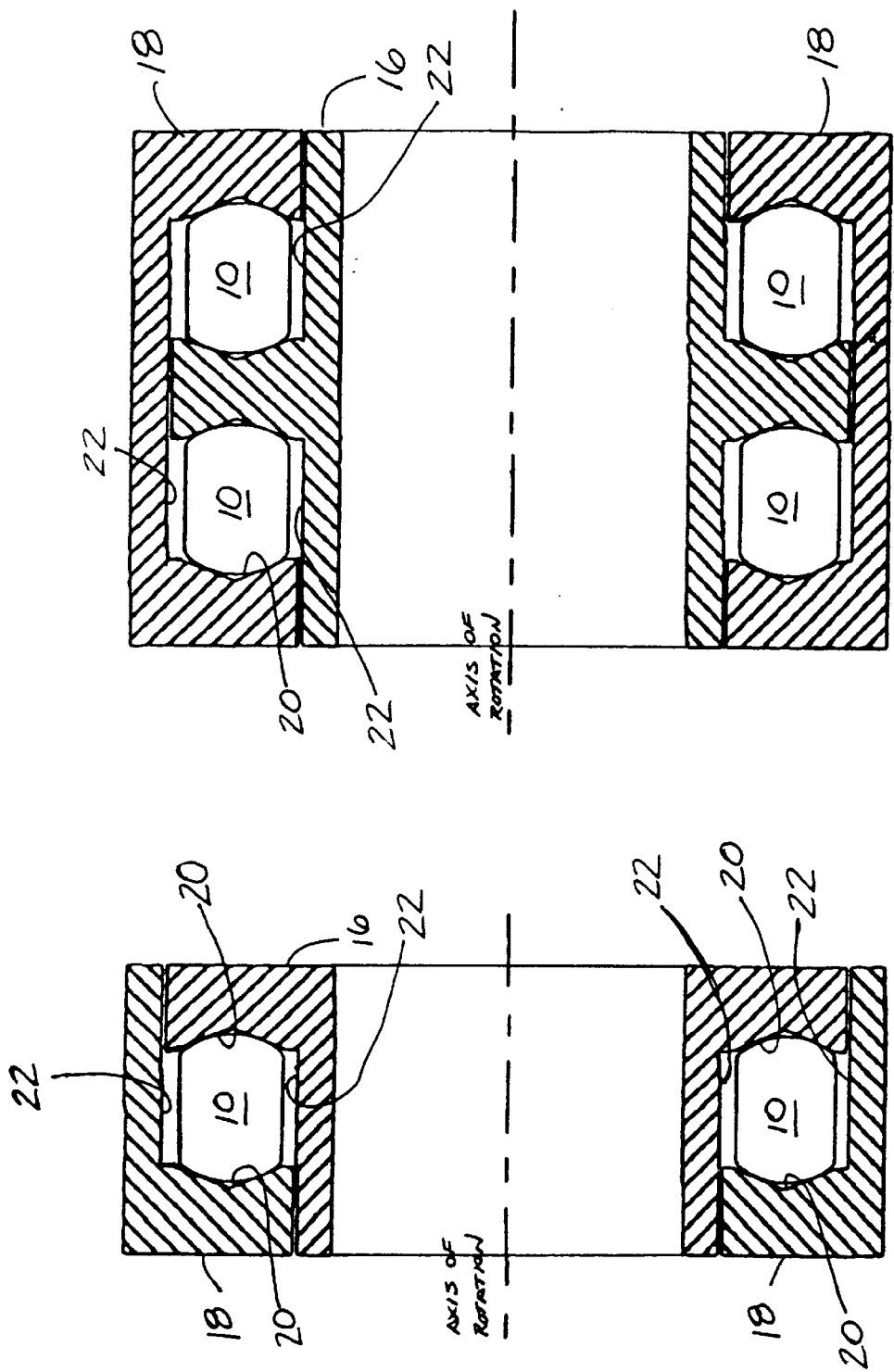

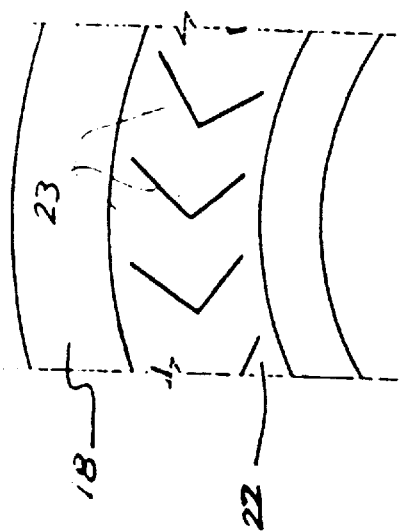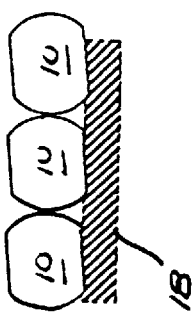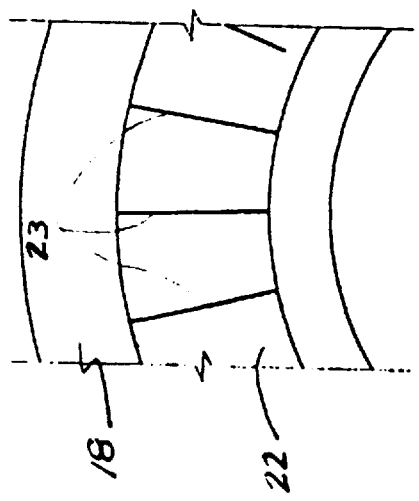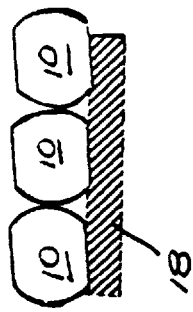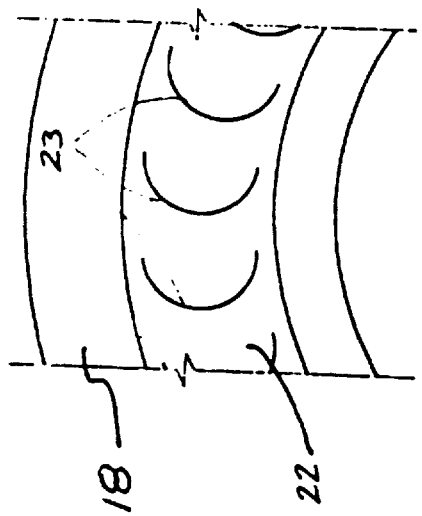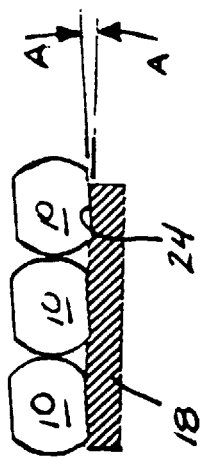

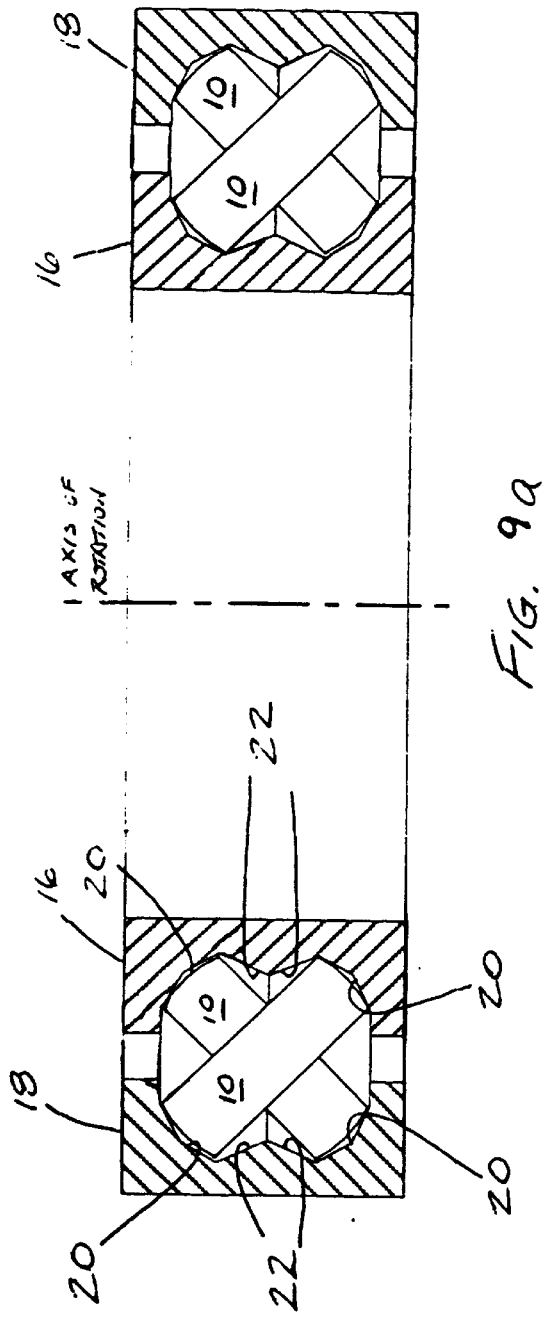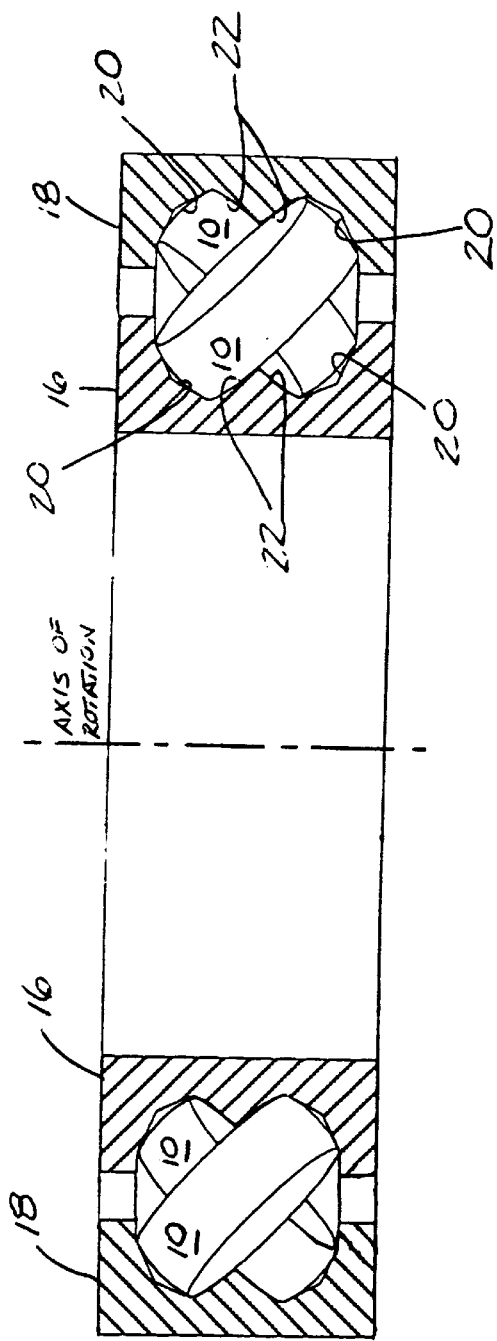
FIG. 9a
FIG. 9b

FIG. 12b
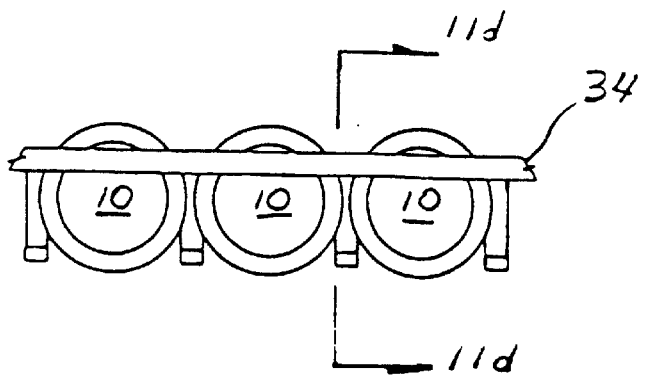
FIG. 12c
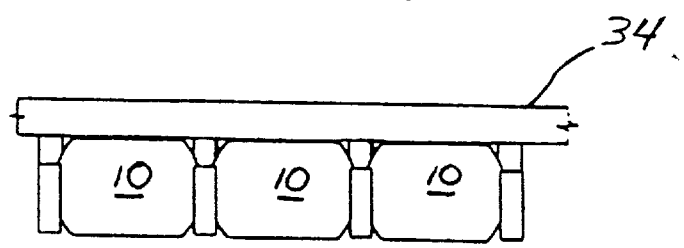
FIG. 12d
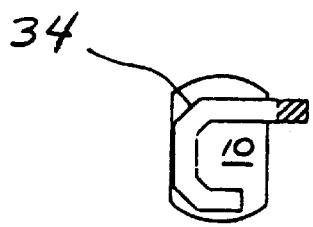
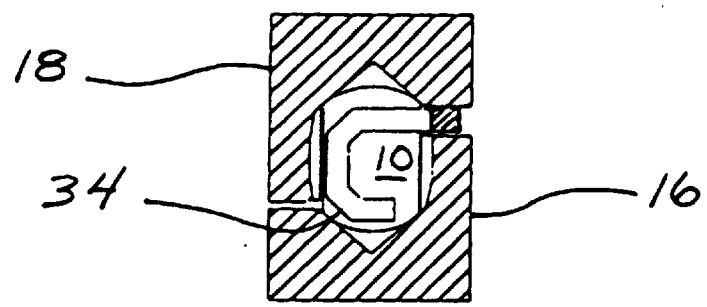
FIG. 12a

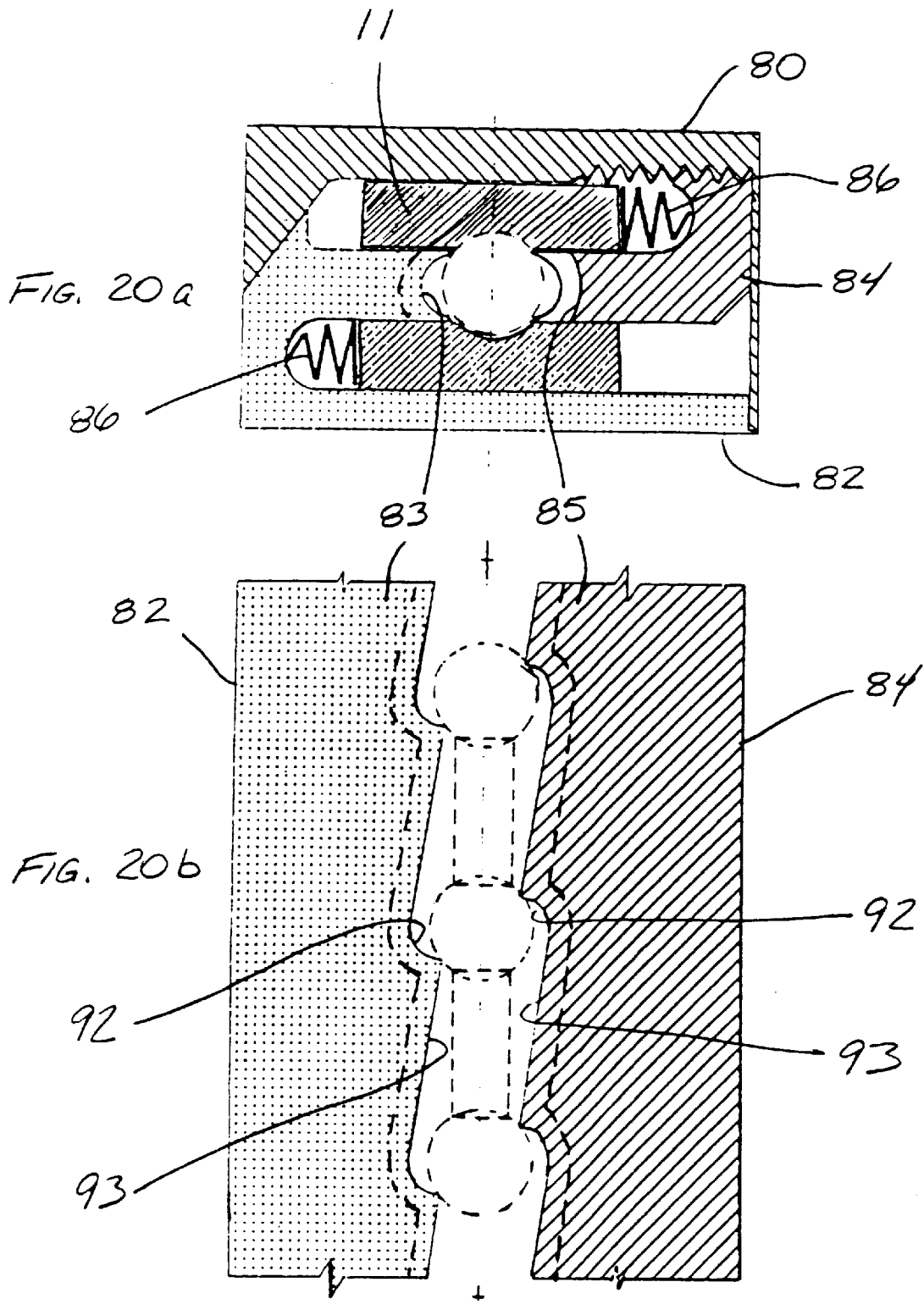

ROLLING-ELEMENT CLUTCH ASSEMBLY

CROSS REFERENCE TO RELATED APPLICATIONS

This is a division of U.S. application Ser. No. 09/206,618 filed on Dec. 7, 1998.

BACKGROUND OF THE INVENTION

1. Field of the Invention

The present invention pertains to the field of clutching mechanisms, and, in particular, to a rolling-element clutch.

2. Description of the Related Art

A freewheel clutch is a device that will drive a rotating load in one direction, but will allow it to freewheel or spin at any speed in the other direction. There is a need to make a more compact and rugged freewheel clutch. All current designs need separate devices to support the rotating load on the shaft and to have the shaft drive this load. Current techniques are called ratchet and pawl, wrap spring, sprag, roller clutch, ball clutch, tilting plate, and so forth. Each of these related art devices needs the addition of some bearing device to support the driven load when it is in the freewheel mode.

The typical related art is represented by a one-way clutch bearing having an outer race with an annular inner surface, an inner race with an annular outer surface corresponding to and concentric with the inner surface, and rolling members disposed in an annular space formed between the inner surface and the outer surface, whereby relative rotation of the inner and outer races in one direction is prevented by displacement of the rolling members in the space and a torque is transmitted. A holding means for holding the rolling members is provided at a displacement position whereat the rolling members transmit a predetermined transmission torque, and a means is provided for decreasing a wedge angle at a position before the rolling members arrive at the displacement position.

U.S. Pat. No. 5,573,094, which is assigned in common with the present invention and incorporated herein by reference, discloses a combination bearing/freewheel clutch that is provided with an inner race member defining an inner race surface, an outer race member defining an outer race surface concentric with the inner race member, and a raceway between the inner and outer races. The inner and outer race members each have a series of short radially oriented sawtooth inclines in their respective inner and outer race surfaces at right angles to the raceway. A plurality of modified ball bearings, for instance ball bearings have flattened poles, are disposed in the raceway between the inner and outer race members, such that the modified ball bearings serve to prevent relative rotation of the inner and outer race members in one direction, and to transmit a torque between the inner and outer races.

Although the invention of U.S. Pat. No. 5,573,094 represents a significant development in the art of combination bearing/freewheel clutches, there is need for improvement to provide a rolling-element clutch that is stronger, lighter, more reliable, easier to manufacture, and easier to assemble.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the rolling-element clutch assembly of the invention, in a first aspect, includes a first race member, a second race member and a plurality of rolling elements. The first race member defines a first race surface having a first ratchet surface portion. The second race member defines a second race surface having a second ratchet surface portion. The first race surface and the second race surface define a raceway therebetween. A plurality of rolling elements are disposed in the raceway. The rolling elements provide rolling support between the first race member and the second race member when the first race member moves in a first direction relative to the second race member. At least one of the plurality of rolling elements engages the first and second ratchet surface portions when the first race member moves in a second direction relative to the second race member. The engagement of the rolling element with the first and second ratchet surfaces impedes relative motion between the first race member and the second race member, thereby providing load transmission capability. The first ratchet surface portion including a plurality of inclines extending along the first race surface in the first direction, each incline embedded in the first race surface and having a profile adapted for engaging one of the plurality of rolling elements, the profile of each incline being formed from one or more flat planes.

In a second aspect, the rolling-element clutch assembly of the invention includes a first race member, a second race member and a plurality of rolling elements. The first race member defines a first race surface having a first ratchet surface portion. The second race member defines a second race surface having a second ratchet surface portion, and the first race surface and the second race surface define a raceway therebetween. The plurality of rolling elements are disposed in the raceway and provide rolling support between the first race member and the second race member when the first race member moves in a first direction relative to the second race member. At least one of the plurality of rolling elements engage the first and second ratchet surface portions when the first race member moves in a second direction relative to the second race member, thereby impeding relative motion between the first race member and the second race member and providing load transmission capability. The first race member defines a third race surface, the second race member defines a fourth race surface, and the third race surface and the fourth race surface define a second raceway therebetween. A plurality of rolling elements are disposed in the second raceway.

In a third aspect, the rolling-element clutch assembly of the invention includes a first race member, a second race member and a plurality of rolling elements. The first race member defines a first race surface having a first ratchet surface portion. The second race member defines a second race surface having a second ratchet surface portion and the first race surface and the second race surface define a raceway therebetween. The plurality of rolling elements are disposed in the raceway and provide rolling support between the first race member and the second race member when the first race member moves in a first direction relative to the second race member. The plurality of rolling elements disposed in the raceway include pairs of rolling elements. At least one of the pairs of rolling elements cooperate to engage the first and second ratchet surface portions when the first race member moves in a second direction relative to the second race member, thereby impeding relative motion between the first race member and the second race member and providing load transmission capability.

In a fourth aspect, the rolling-element clutch assembly of the invention includes a first race member, a second race member and a plurality of rolling elements. The first race member defines a first race surface having a first ratchet surface portion. The second race member defines a second race surface having a second ratchet surface portion and the first race surface and the second race surface define a raceway therebetween. The plurality of rolling elements are disposed in the raceway and provide rolling support between the first race member and the second race member when the first race member moves in a first direction relative to the second race member. At least one of the plurality of rolling elements engage the first and second ratchet surface portions when the first race member moves in a second direction relative to the second race member, thereby impeding relative motion between the first race member and the second race member and providing load transmission capability. The first ratchet surface is adjustably coupled to the first race member.

In a fifth aspect of the invention, a rolling-element clutch assembly includes a first race member, a second race member and a plurality of rolling elements. The first race member defines a first race surface having a first ratchet surface portion. The second race member defines a second race surface having a second ratchet surface portion. The first race surface and the second race surface define a raceway therebetween. A plurality of rolling elements are disposed in the raceway. The rolling elements provide rolling support between the first race member and the second race member when the first race member moves in a first direction relative to the second race member. At least one of the plurality of rolling elements engages the first and second ratchet surface portions when the first race member moves in a second direction relative to the second race member. The engagement of the rolling element with the first and second ratchet surfaces impedes relative motion between the first race member and the second race member, thereby providing load transmission capability. The first ratchet surface portion includes a plurality of inclines extending along the first ratchet surface portion in the first direction, each incline is embedded into the first ratchet surface portion and has a profile adapted for engaging one of the plurality of rolling elements. A rolling element separator is provided that allows the rolling elements to freely roll when the first race member moves in a first direction relative to the second race member and to freely pivot into engagement with or disengagement from the ratchet surfaces when the first race member moves in a second direction relative to the second race member.

In a sixth aspect of the invention, a rolling-element clutch assembly includes a first race member, a second race member and a plurality of rolling elements. The first race member defines a first race surface. The second race member defines a second race surface and the first and second race surfaces defining a raceway therebetween. There are provided first and second ratchet portions. The plurality of rolling elements are disposed in the raceway and provide rolling support between the first race member and the second race member when the first race member moves in a first direction relative to the second race member. At least one of the plurality of rolling elements engages the first and second ratchet portions when the first race member moves in a second direction relative to the second race member. The first ratchet portion is adapted to move relative to the first race member when at least one of the plurality of rolling elements engages the first and second ratchet portions, thereby permitting controlled slippage of the clutch assembly.

In a seventh aspect of the invention, a rolling-element clutch assembly for use with a bearing assembly is provided. The bearing assembly has first and second races and a plurality of rolling elements. The clutch assembly includes first and second adapter members and an adjustable locking member. The second adapter member has a first ratchet extension projecting between the first and second races of the bearing assembly. The adjustable locking member has a second ratchet extension projecting between the first and second races of the bearing assembly opposite the first ratchet extension. Each of the first and second ratchet extensions has at least one concavity for accommodating at least one of the plurality of rolling elements of the bearing assembly. The adjustable locking member is adjustably coupled to the first adapter member such that in a first position the concavities of the first and second ratchet extensions are distanced from the rolling elements, thereby allowing the rolling elements to freely roll. In a second position the concavities of the first and second ratchet extensions engage at least one of the plurality of rolling elements, thereby impeding relative motion between the first and second race members of the bearing assembly. The adjustable locking element is in the second position when the first adapter member moves in a second direction relative to the second adapter member.

In an eighth aspect of the invention, the rolling-element clutch assembly includes first and second race members and a plurality of rolling elements. The first race member defines a first race surface and a first concavity. The second race member defines a second race surface and a second concavity. The first race surface and the second race surface define a raceway therebetween, the raceway having a first longitudinal axis. The first concavity and the second concavity, when aligned, define a passageway therebetween, the passageway for accommodating a rolling element. The plurality of rolling elements is disposed in the raceway, the rolling elements providing rolling support between the first race member and the second race member when the first race member moves in a first direction relative to the second race member. At least one of the plurality of rolling elements is capable of lodging in the passageway when the first race member moves in a second direction relative to the second race member, thereby impeding relative motion between the first race member and the second race member and providing load transmission capability.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIGS. 2a and 2b are partial cross-sectional side views of the rolling-element clutch assembly of FIG. 1 showing, in a break-away, a single modified ball bearing in the free and locked positions respectively.

FIG. 4a is a cross-sectional view of a first embodiment of the present invention in a free position.

FIGS. 4b and 4c are partial top and cross-sectional side views, respectively, of a first race surface configuration of the first embodiment.

FIGS. 4d and 4e are partial top and cross-sectional side views, respectively, of a second race surface configuration of the first embodiment.

FIGS. 4f and 4g are partial top and cross-sectional side views, respectively, of a third race surface configuration of the first embodiment.

FIG. 5 is a cross-sectional view of a second embodiment of the present invention in a free position.

FIGS. 9a and 9b are radial cross-sectional views of a fourth embodiment of the present invention in a free and locked position, respectively.

FIG. 10a is a radial cross-sectional view of a fifth embodiment of the present invention, this embodiment illustrating the use of a rolling element separator.

FIG. 10b is a perspective view of the rolling element separator of FIG. 10a.

FIG. 11b is a perspective view of the rolling element separator of FIG. 11a.

FIG. 12a is a radial cross-sectional view of a seventh embodiment of the present invention, this embodiment illustrating the use of a rolling element separator.

FIGS. 12b and 12c are top and side views, respectively, of the rolling element separator of FIG. 12a with rolling elements in place.

FIG. 12d is a cross-sectional view of the rolling element separator of FIG. 12b, taken along the line 12d—12d.

FIG. 20a is a radial cross-sectional view of a fourteenth embodiment of the present invention in the free position, this embodiment illustrating the use of spherical rolling elements.

FIG. 20b is a cross-sectional side view of the first race member and annular ring of FIG. 20a.

DESCRIPTION OF THE PREFERRED EMBODIMENTS

Reference will now be made in detail to the present preferred exemplary embodiments of the invention, which are illustrated in the accompanying drawings. Wherever possible, the same reference numbers will be used throughout the drawings to refer to the same or like parts.

A clutch is a device that will drive a load in one direction, but will allow it to move freely in the other direction. For instance, a freewheel clutch is a device that will drive a rotating load in one direction, but will allow it to freewheel or spin at any speed in the other direction. This invention involves the use of rolling elements and special first and second race members to achieve both a rolling support and a one-way clutch. This invention can accommodate both linear motions and linear loads and rotational motions and rotational loads or torques.

Figure 1:
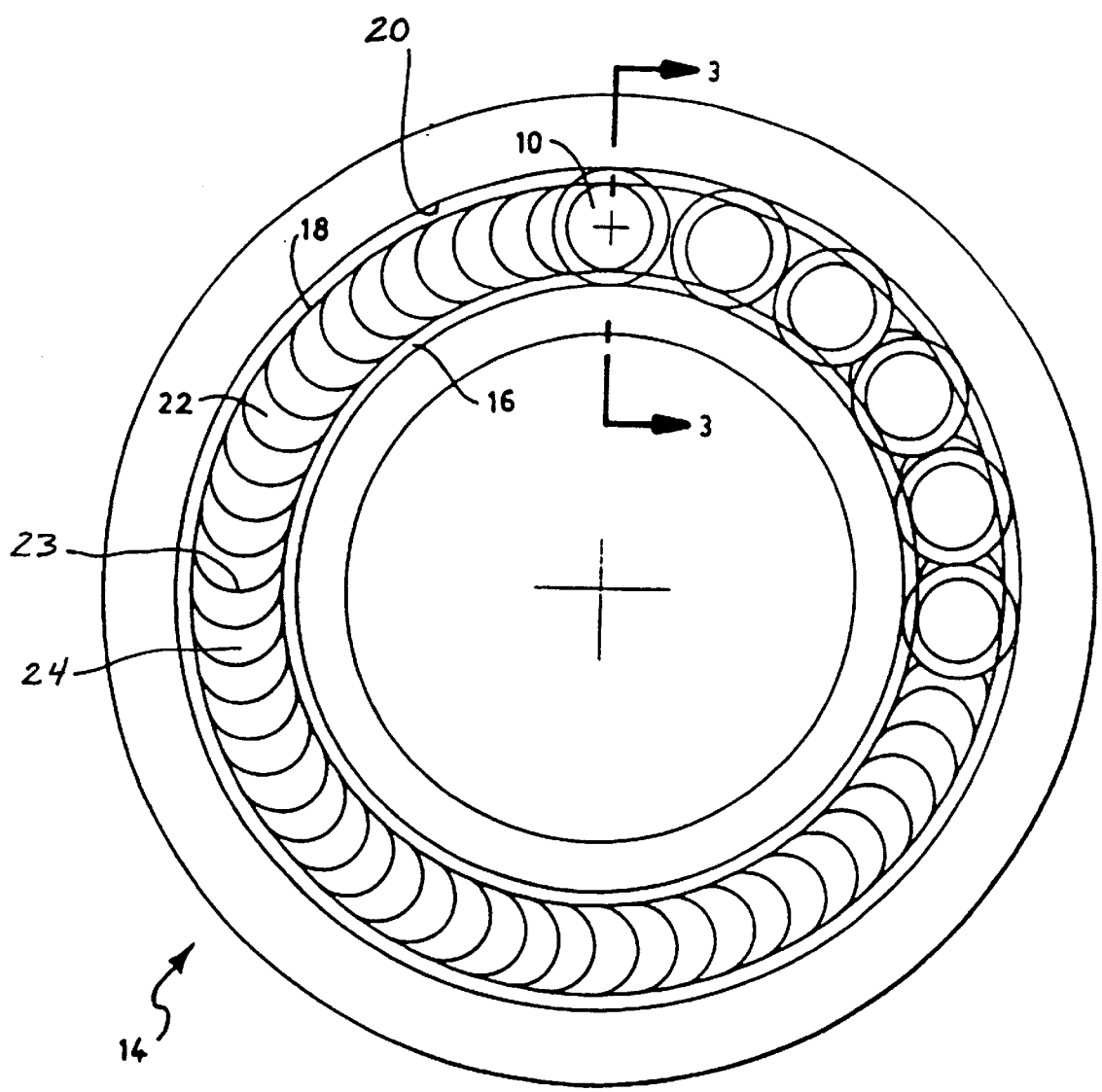
FIG. 1 is a cross-sectional top view of a rolling-element clutch assembly of a type to which the present invention is applicable.

FIGS. 1 through 3b, which show a rolling-element clutch such as described in co-owned U.S. Pat. No. 5,573,094, generally illustrate the basic elements and the arrangement of these elements of the present invention. FIG. 1 is a cross-sectional plan view of rolling-element clutch 14. Clutch 14 has a first race member 16 defining a first race surface, a second race member 18 defining a second race surface, and a plurality of rolling elements 10, or in this instance, ball bearings 10' in a raceway 20 therebetween. The ball bearings 10' are modified by having their poles ground flat. The first race member 16 and the second race member 18 each have a ratchet surface 22. In this embodiment, the ratchet surface 22 is generally perpendicular to the raceway 20. As best shown in FIGS. 2a and 2b, the ratchet surface 22 includes a series of sawtooth inclines 24 embedded into the ratchet surfaces 22 of the first and second race members 16, 18. As best shown in FIG. 1, each individual incline has a semi-circular profile 23 or cross-section, which complements the circular shape of the ball bearings 10'.

The flattened poles 12 of the modified balls 10' act as pawls. When the first and second race members 16, 18 rotate in the free mode, (FIGS. 2a and 3a), the modified balls 10' are forced to roll past the ratchet surfaces 22. When the race members 16, 18 rotate in the engaged or locked mode (FIGS. 2b and 3b), the modified balls 10' which will naturally wobble slightly, will twist just enough to engage the ratchet surfaces 22 of both race members 16, 18 and therefore the races will lock together. Torque is transmitted by the ratchet surfaces 22. As shown in FIG. 2b, torque is transmitted when the modified balls 10' become wedged between the radially oriented sawtooth inclines 24 of the ratchet surfaces 22 of the first and second race members 16, 18.

In operation, the first race member 16 may be connected to a driven member (not shown) and the second race member 18 may be connected to a driving member (not shown) or vice versa. The clutch 14 transmits torque in only one direction of rotation, as shown by the direction of the arrows in FIG. 2b and freely moves in the other direction, as shown by the direction of the arrows in FIG. 2a. The modified balls 10' move out of or into engagement with the sawtooth inclines 24 into a disengaged/free position or engaged/locked position, as shown in FIGS. 2a, 3a and 2b, 3b, respectively.

The ratchet surface 24 with its sawtooth inclines 22 need not be at right angles to the raceways 20. The driving member could be either race member. The rolling-element clutch 14 can be machined into the mechanism that uses its functions, making an even more compact assembly. For example, the first race member 16 may be part of a shaft and the second race member 18 may be machined into a housing. The number of balls 10 and the number of ratchets 22 on each race member 16, 18 can all be varied to increase the number of possible engagements. This would decrease the minimum backlash angle. The number of rolling elements 10 and ratchets 22 could conversely be optimized to increase the number of simultaneous engagements. This would maximize the torque carrying ability.

Figure 3A:
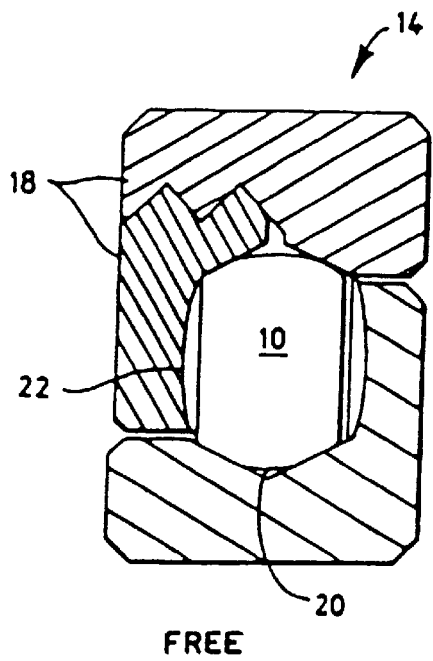
FIGS. 3a and 3b are radial cross-sectional views of the rolling-element clutch assembly of FIG. 1, taken along the line 3—3 of FIG. 1, in the free and locked positions respectively.

FIG. 4a illustrates a first embodiment of the rolling-element clutch assembly of the present invention. This figure is a cross-sectional view, similar to FIG. 3a, showing an alternative orientation of the rolling elements 10, or, in this instance, modified balls 10', within the raceway 20 defined between the first race member 16 and the second race member 18. FIG. 3a shows the modified balls 10' oriented so that their flat surfaces are adjacent the sawtooth inclines 22. FIG. 4a shows the modified balls 10' at right angles to the original orientation shown in FIG. 3a. However, the modified balls 10' could be oriented in any angle. Changing the orientation of the balls 10' increases design flexibility and improves the ability of the rolling-element clutch assembly to resist forces in the non-radial direction.

The ratchet surfaces 22 could be a machined or cast part of their respect raceways. Alternatively, the ratchet surfaces 22 could be distinct elements that are permanently attachable, or separable and reattachable, to the raceways. Furthermore, although the ratchet surfaces are shown in FIG. 1 as sawtooth inclines with each sawtooth incline having a semi-circular profile 23, the inclines 24 may have other profiles 23, so long as the profiles 23 allow the rolling elements 10 to slide past the first and second race members 16, 18 rotating in one direction and to engage the ratchet surfaces 22 of the first and second race members 16, 18 rotating in the opposite direction. FIGS. 4b–4g illustrate three different ratchet configurations. FIGS. 4b and 4c show the ratchet configuration of the first embodiment, wherein each individual sawtooth incline 24 has a semi-circular profile 23 that complements the shape of the rolling elements 10. Having such a complementary profile maximizes the load-carrying ability of the engaged clutch assembly 14. However, machining such ratchet surfaces 22 is expensive and time consuming. FIGS. 4d and 4e show an alternative ratchet configuration, wherein the profile 23 of each individual sawtooth incline 24 is composed of a flat surface. These profiles 23 do not complement the shapes of the rolling elements 10, however, machining such flat ratchet surface profiles 23 is much less costly and less time-consuming than machining semi-circular profiles 23, and is particularly appropriate when the clutch assembly 14 is not highly loaded. FIGS. 4f and 4g show a further alternative ratchet configuration, wherein the profile 23 of each individual sawtooth incline 24 is composed of more than one flat surface, in this instance, a chevron. The chevron profile is less costly to machine than the semi-circular profile, while generally having a higher load-carrying capacity than the profile having a single flat surface.

FIG. 4c also shows the angle A—A of the incline of the sawtooth inclines 24. Angle A—A can be shallow for fast engagements, such as needed in rapidly reciprocating devices, or it can be steep to allow the clutch assembly 14 to develop its full load carrying capacity. Typically, angle A—A will range from about 3°–20°. Moreover, any of the above-described ratchet surfaces 22 could be somewhat conformal or intentionally flexible. Such conformal ratchet surfaces could allow soft stops or soft engagements, limited slip arrangements, etc.

Figure 3B:
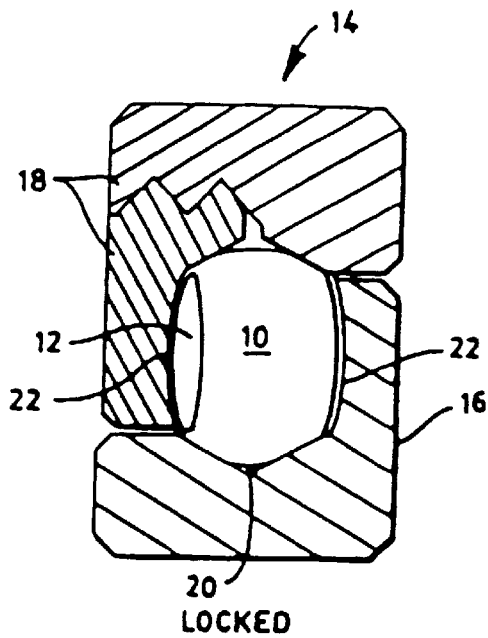
Figure 4H:
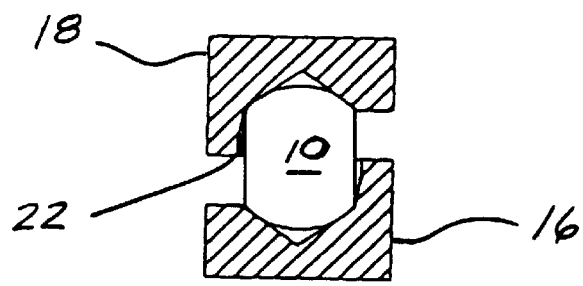
FIG. 4h is a radial cross-sectional view of a modification to the first embodiment of the rolling-element clutch assembly.

FIG. 4h shows a modification to the first and second race members 16, 18 wherein the ratchet surfaces 22 are reduced in height from the ratchet surfaces 22 shown in FIGS. 3a and 3b. The ratchet surfaces 22 need not provide for full contact with the modified balls 10', because most of the torque is transmitted by only a portion of the ratchet surface 22. Smaller first and second race members 16, 18 could save material, weight, and machining time, provide access for lubrication, provide clearance for rolling element separators, provide room for environmental seals, and make assembly and inspection easier.

In the freely moving direction of rotation, the modified balls 10' of the first embodiment could have a tendency to wobble, which could increase wear of the components of the clutch assembly 14. In the locking direction of rotation, the modified balls 10' could have a tendency to wobble haphazardly, thereby compromising the time to engagement. Shallow, diagonal grooves can be added to the surface of the raceway 20 to encourage the modified balls 10' to roll without wobbling excessively in the freely moving mode, and to encourage the modified balls 10' to wobble when the clutch is moved in the locking direction.

Figure 4I:
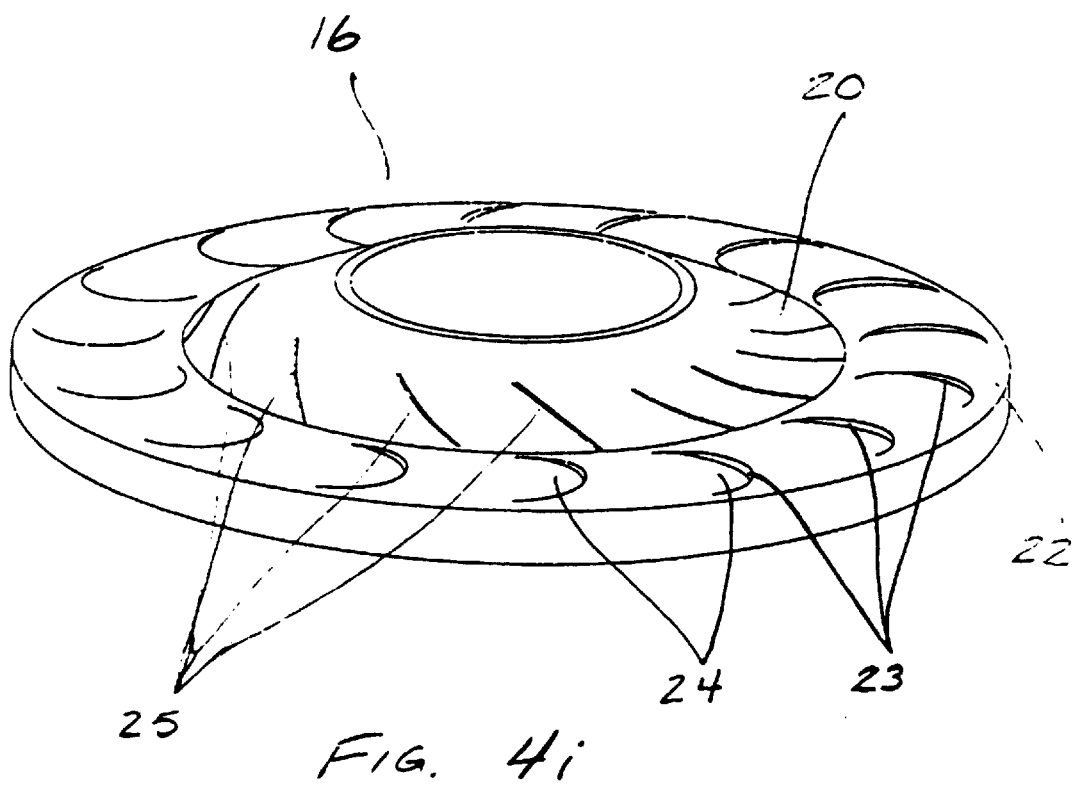
FIG. 4i is a perspective view of the first race member illustrating a modification to the raceway of the first embodiment.

FIG. 4i illustrates this possible modification to the first and second race members 16, 18. Diagonal scratches or short shallow grooves 25 are provided on the raceways 20. These grooves point toward the deep ends of the ratchet pockets or sawtooth inclines 24. In the freely moving mode, as the modified balls 10' roll over these grooves 25, the balls 10' will veer away from the ratchet pockets, preventing any tendency for resonant wobbling. Resonant wobbling causes the balls to chatter during high speed rotation. Upon reversing direction and transitioning into the locked position, the grooves 25 guide the modified balls 10' into the nearest pocket, thereby producing a faster, more secure engagement. The grooves 25 may be on one or both raceways 20, or on both sides of each raceway 20, and the raceway 20 may be of any suitable cross-sectional shape. For any given application, the number and angle of the grooves may be determined by a person skilled in the art. Furthermore, the clutch assembly 14 need not be rotational, but could also be used in linear motion applications. Finally, the rolling element 10 need not be modified balls 10', but, as discussed below, could be other suitably shaped rolling elements.

FIG. 5 shows another embodiment of the present invention. This figure is a cross-sectional view showing a matched, opposing pair of rolling elements 10 in their respective raceways 20. Again, the rolling elements 10 are shown as modified balls 10'. Alternatively, either one of these modified balls 10' could be a regular ball bearing. Furthermore, the modified balls 10' could be oriented in the same direction or in directions different from one another. Moreover, the raceways 20 could be axially adjacent (as shown), radially adjacent, or at some slanted orientation to one another.

Concurrently with changing the orientation of the rolling elements 10, the location of the ratchet surfaces 22 or sawtooth inclines 24 on the first and second race members 16, 18 will be varied. As shown in FIGS. 2a, 2b and 3a, 3b, the sawtooth inclines 24 are located on the surfaces of the first and second race members 16,18 such that a vector perpendicular to the ratchet surface 22 is parallel to the rotational axis. As shown in FIGS. 4 and 5, the sawtooth inclines 24 are located on the surfaces of the first and second race members 16,18 such that a vector perpendicular to the ratchet surface 22 points in the radial direction. In general, changing the orientation of the rolling elements 10 means there should be a corresponding change in orientation of the sawtooth inclines 24.

Figure 6A:
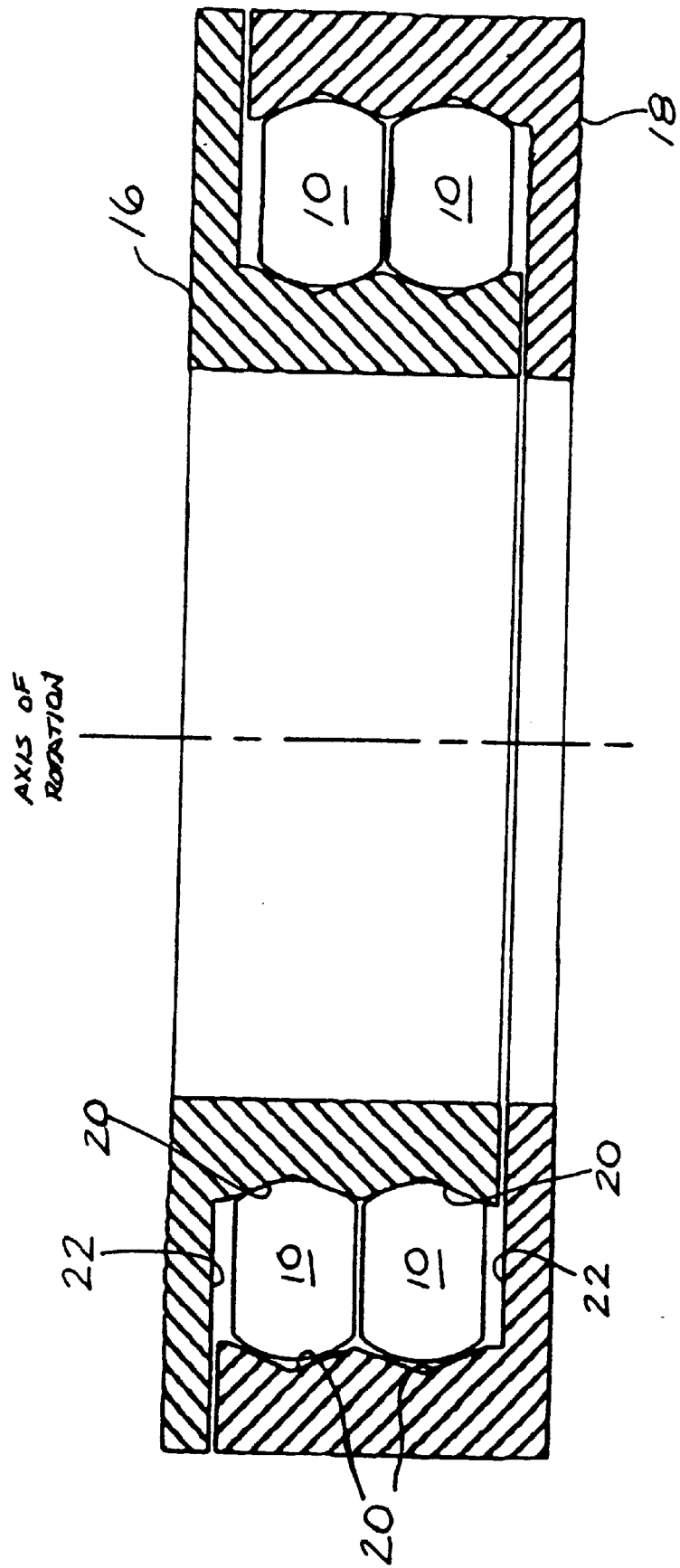
FIG. 6a is a cross-sectional view of a third embodiment of the present invention in a free position.
Figure 6B:
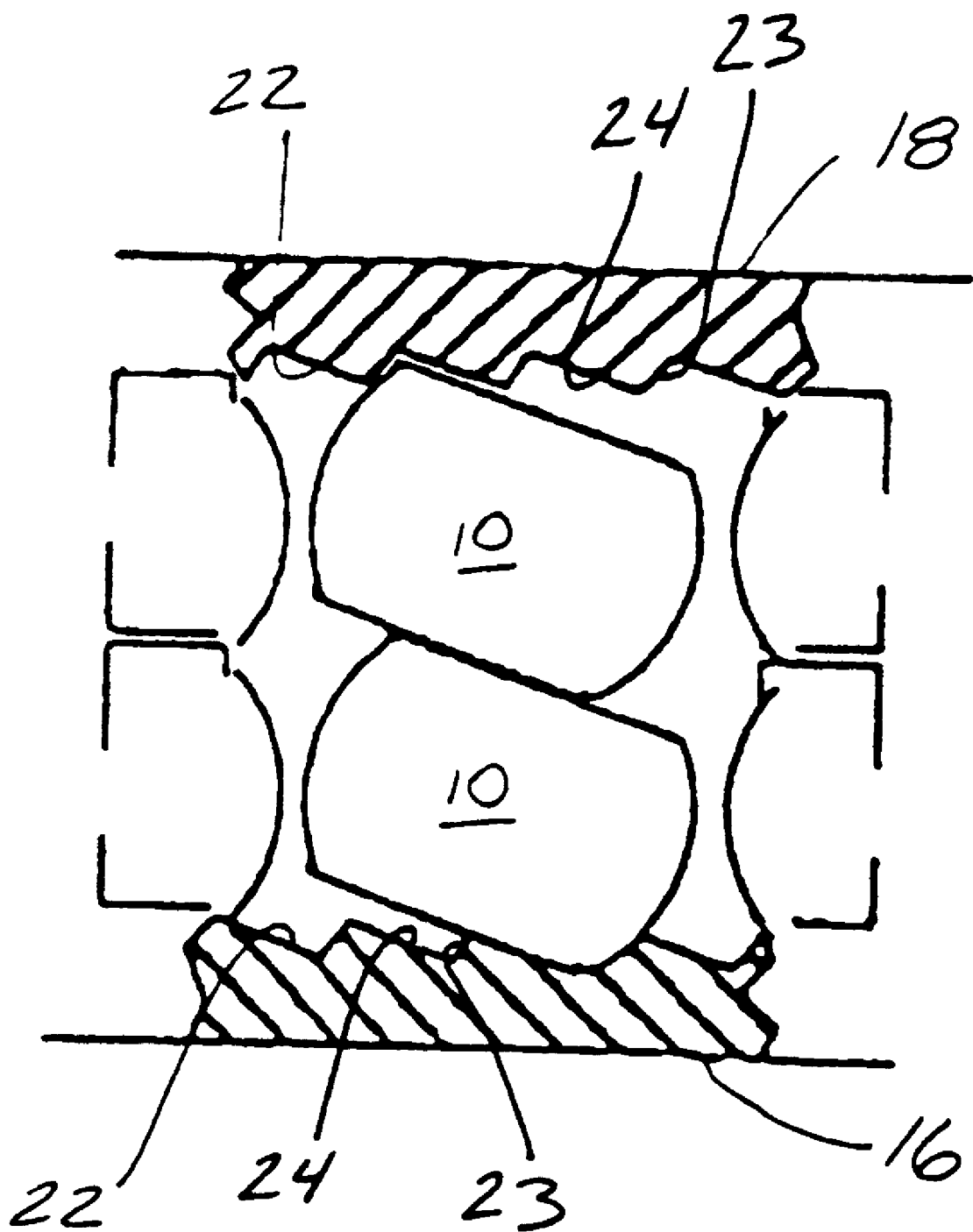
FIG. 6b is a circumferential cross-sectional view of a section of the third embodiment of the present invention in a locked position.

FIGS. 6a and 6b illustrate yet another alternate embodiment of the present invention. In this embodiment, the space between the second race member 18 and the first race member 16 can accommodate two rolling elements 10. This double-width raceway 20' allows side-by-side placement of the rolling elements 10. Such a dual rolling element arrangement provides a radial, axial, and moment load capacity that approximately doubles the load capacity of a single-width raceway assembly. In the free mode, as shown in FIG. 6a, the motion is similar to that described above. In the engaged or locked mode as shown in FIG. 6b, the dual rolling elements 10 cooperate to transmit the torque between the second race member 18 and the first race member 16.

For the above-described embodiments, the raceways 20 and first and second race members 16, 18 could be non-circular and/or non-rotary for applications in devices such as machine ways, linear motor tracks, roller coaster rails, material handling conveyors, unidirectional ball or roller screws, etc. Furthermore, for such non-rotary applications, the rolling elements 10 could actually be non-rolling elements such as sliders. Even further, the orientation of the modified balls 10' could be such that the balls 10' are encouraged to tumble during freely moving operation of the clutch assembly 14 so that the flat surfaces of the modified balls 10' are continually changing direction. This aspect could be useful in short throw switches, relays, and indexing drives.

Figure 7A:
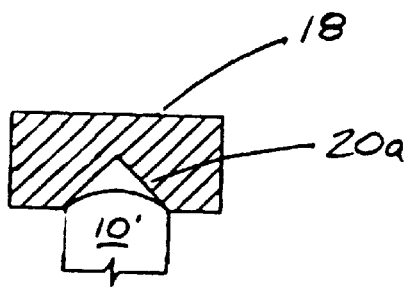
FIGS. 7a, 7b, 7c, 7d, and 7e are partial radial cross-sectional views of the first embodiment showing various raceway configurations.
Figure 7B:
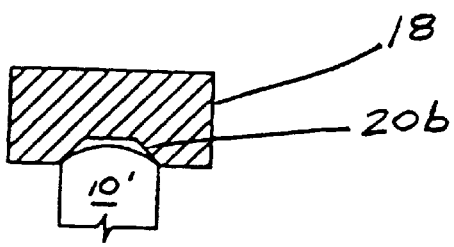
Figure 7C:
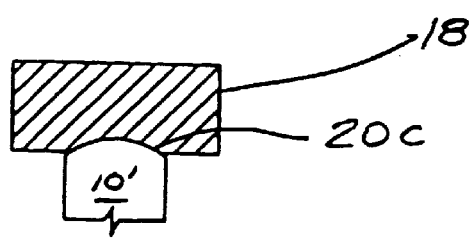
Figure 7D:
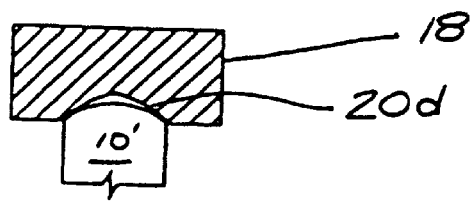
Figure 7E:
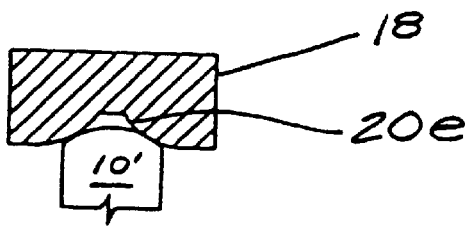

Both the first and the second race members 16, 18 are provided with raceways 20 in which the rolling elements 10 travel. The present invention may incorporate any of a variety of alternative raceway cross-sections, including those shown in FIGS. 7a–7e. FIG. 7a shows a conical raceway 20a; FIG. 7b shows a flat-top raceway 20b; FIG. 7c shows a circular raceway 20c; FIG. 7d shows an arched raceway 20d; and FIG. 7e shows a back, or reverse, arched raceway 20e.

Figure 8A:
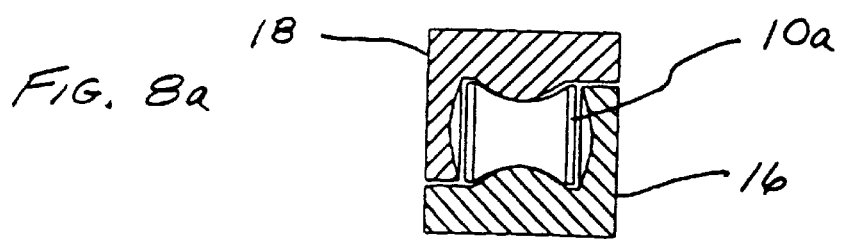
FIGS. 8a, 8b, 8c, 8d, and 8e are radial cross-sectional views of the first embodiment showing various rolling element configurations.
Figure 8B:
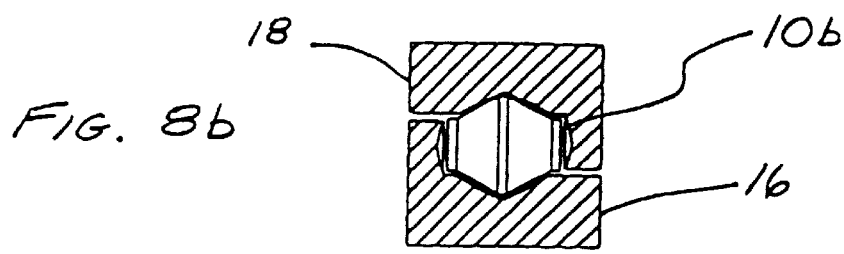
Figure 8C:
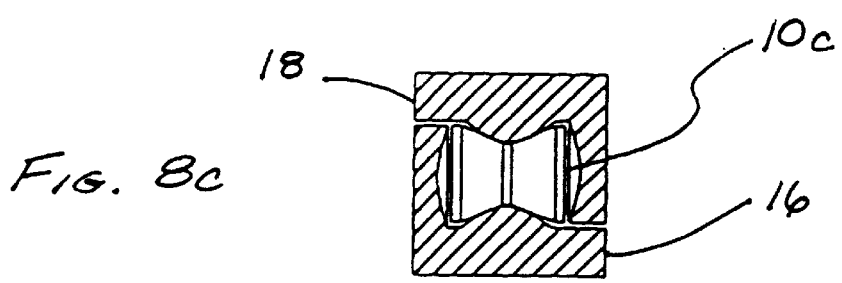
Figure 8D:
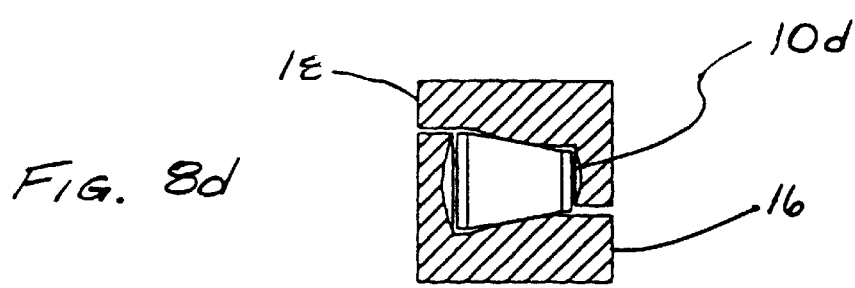
Figure 8E:
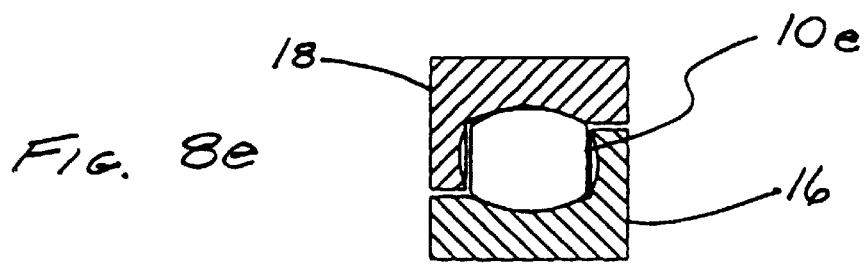

The present invention may incorporate any of a variety of rolling element configurations. FIGS. 8a–8e illustrate several exemplary rolling elements. FIG. 8a shows a spool-type rolling element 10a. The spool-type rolling element 10a has great strength and is commonly found in spherical rod ends used in aircraft control surface linkages. FIG. 8b shows a double cone rolling element 10b, which can handle heavy loads while operating for a long service life. FIG. 8c shows a bow tie rolling element 10c. The bow tie rolling element 10c provides high axial stiffness and can carry heavy loads. FIG. 8d shows a tapered-type rolling element 10d, which can carry axial loads extremely well and is often found in a tilted alignment with the small end pointed inward towards the axis of rolling element rotation. FIG. 8e shows a barrel-type rolling element 10e, which is also capable of carrying heavy loads. Note that the configuration of the raceway 20 and the shape of the rolling elements, in general (except for FIGS. 7c, 8a, 8b and 8e), do not match exactly. This mismatch allows the rolling elements to skew slightly sideways when the rolling elements are engaged by the ratchets in the locked position.

FIGS. 9a and 9b illustrate another embodiment of the present invention. The space between the second race member 18 and the first race member 16 can accommodate crossed rolling elements 10. Raceways 20 and 21 are provided in an X-shaped configuration that allows adjacent, alternating rolling elements 10 to be oriented perpendicular to one another. As with the dual rolling element arrangement, such a crossed rolling element arrangement provides a radial, axial, and moment load capacity that approximately doubles the load capacity of a single-width raceway assembly. In the free mode as shown in FIG. 9a, the motion is similar to that described in U.S. Pat. No. 5,573, 094. In the engaged or locked mode as shown in FIG. 9b, the crossed rolling elements 10 cooperate to transmit the torque between the second race member 18 and the first race member 16.

In FIGS. 9a and 9b, the crossed rolling elements 10 are shown oriented at a 45° angle to the axis of rotation of the clutch assembly 14. However, it is within the scope of the present invention to orient the crossed rolling elements 10 at any orientation relative to the axis of rotation. Furthermore, it is within the scope of the present invention to orient the crossed rolling elements 10 at any orientation relative to each other.

FIGS. 9a and 9b depict the crossed rolling elements 10 as segments of spheres or ball bearings with opposite poles flattened. Other rolling element shapes, including barrel, needle, double cone, rod, or disk, may also be used. Furthermore, the crossed rolling elements need not have a fixed axis of rotation. Nor need they rotate at all. Linear motion, as used in roller coasters, ball screws, roller screws and jack screw devices may be accommodated by the crossed rolling elements of this embodiment.

The illustrations of the above embodiments show the rolling elements of the present invention as being in direct contact with each other. However, each of the above described embodiments may also be used with rolling element separators. Rolling element separators, located in the raceway 20 defined by the first and second race members 16, 18, prevent the rolling elements from directly contacting each other. Moreover, rolling element separators allow the rolling elements to freely roll when the clutch assembly 14 is in the free mode and to freely pivot into engagement with or disengagement from the ratchet surfaces of the first and second race members 16, 18 when entering or exiting the locked position, respectively. Because rolling element separators prevent the rolling elements from directly rubbing against one another, they reduce the friction in the clutch assembly and thereby promote both a longer life of the rolling elements and an increased rotational speed. Furthermore, rolling element separators provide inherent reservoirs for lubricants within the raceways, thereby allowing for better dispersion of such lubricants. In addition, the use of rolling element separators may simplify the assembly of the rolling elements within the raceways by permitting preassembly of a rolling element/rolling element separator subassembly.

Figure 10:
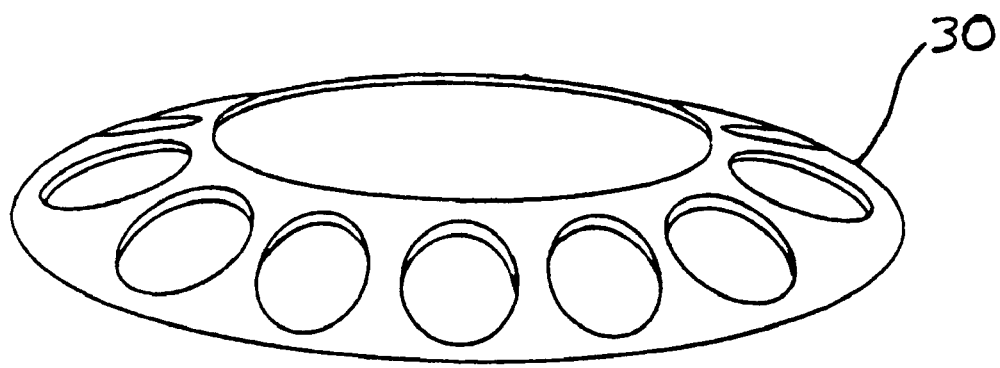
Figure 10:
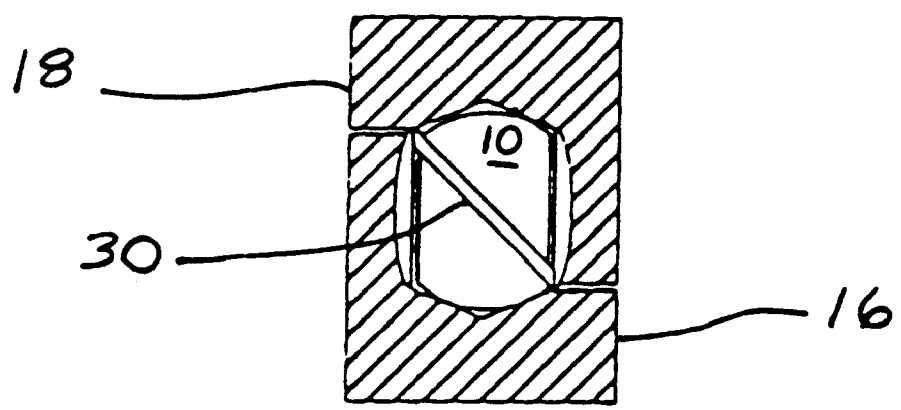

A further embodiment of the present invention, illustrating the use of a rolling element separator, is shown in FIG. 10a. The particular rolling element separator of the embodiment of FIG. 10a is a perforated cone separator 30 as shown in FIG. 10b. This perforated cone separator 30 is a shallow, truncated, hollow cone having an array of circular cutouts through which the rolling elements 10 project.

Figure 11B:
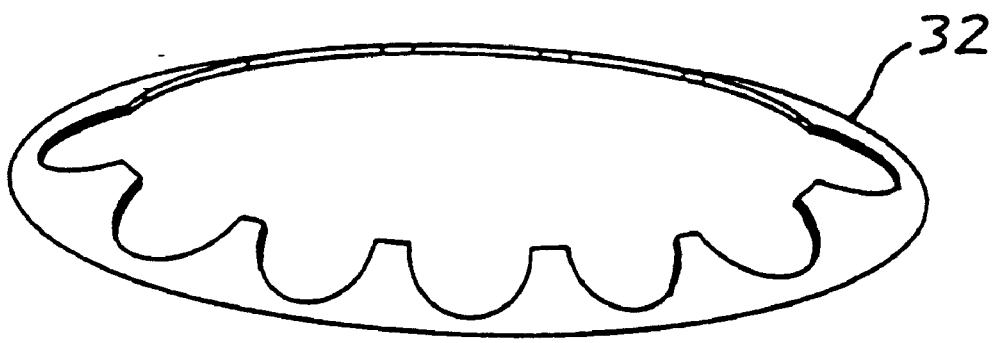
Figure 11A:
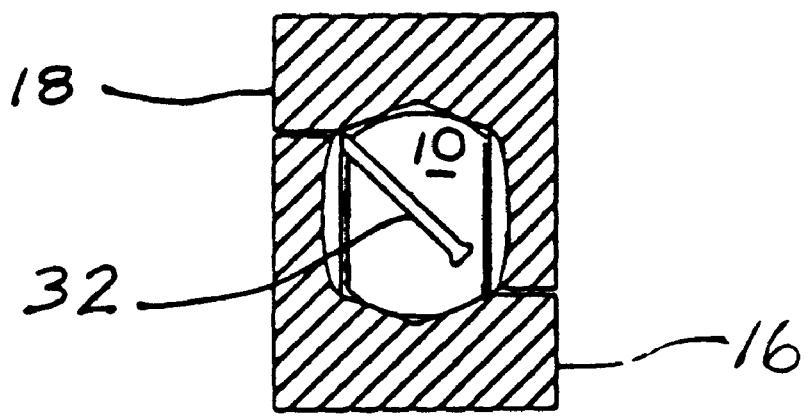
FIG. 11a is a radial cross-sectional view of a sixth embodiment of the present invention, this embodiment illustrating the use of a rolling element separator.

Another embodiment illustrating the use of a rolling element separator is shown in FIGS. 11a and 11b. As shown in FIG. 11b, this cone-with-fingers separator 32 is best described as a perforated cone separator with a missing rim or as on open-perforated cone separator. The rolling elements are located in the partially open, circular cutouts with the fingers, i.e., the material between the cutouts, extending between the rolling elements. Although shown in FIG. 11b as having a missing or open inner edge, the cone-with-fingers separator 32 could alternatively have a missing or open outer edge. Both the perforated cone separator 30 and the cone-with-fingers separator can be made, i.e., machined, cast, molded, etc., from a variety of materials, including nylon, teflon, oil-impregnated sintered bronze, or other metallic or non-metallic sheet or bar stock.

Still another embodiment of the present invention depicting the use of a rolling element separator is shown in FIGS. 12a–12d. As best shown in FIGS. 12b–12d, a fingerstock separator 34 includes an elongate bar, having a longitudinal axis, from which a plurality of elongate projections, or fingers, project. These fingers are regularly-spaced along the length of the bar and are perpendicularly coupled to the bar. Furthermore, the attachments of these fingers to the bar all lie in a single attachment plane. The fingers, as best shown in FIG. 12d, may be curved or bent out of the plane of attachment. As best shown in FIGS. 12b and 12c, the elongate bar extends along the row of aligned rolling elements 10 with the fingers projecting between the rolling elements. Although, the fingers are shown as projecting between each rolling element 10 and the adjacent rolling element 10, the fingers could also extend between adjacent pairs of rolling elements.

Figure 13B:
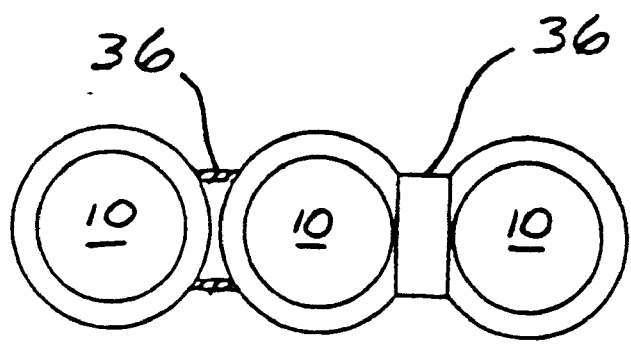
FIG. 13b is a side view of the rolling element separator of FIG. 13a with rolling elements in place.
Figure 13A:
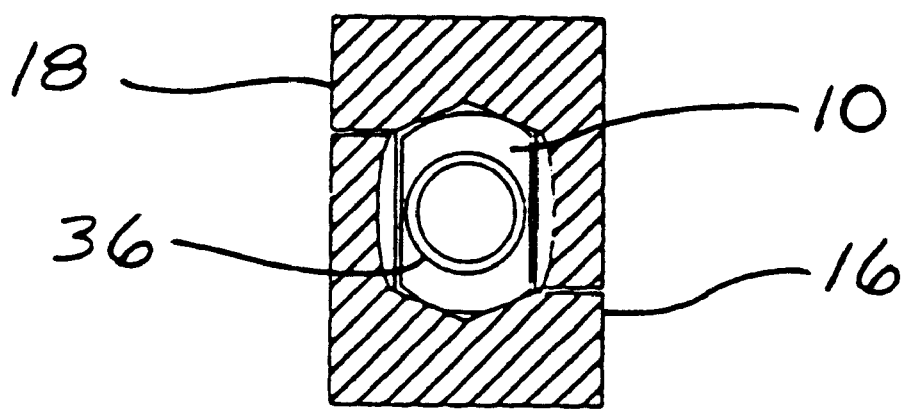
FIG. 13a is a radial cross-sectional view of an eighth embodiment of the present invention, this embodiment illustrating the use of a rolling element separator.

A still further embodiment having a rolling element separator is shown in FIGS. 13a and 13b. The rolling element separator of this embodiment, ring separator 36, includes a plurality of distinct rings or short cylindrical sections located between the adjacent rolling elements. The longitudinal axes of the rings or cylinders, i.e., the axes that are perpendicular to the radial plane of the rings, are aligned with the row of aligned rolling elements 10. The fingerstock separator 34 and the ring separator 36 could be made from a variety of materials, including nylon, teflon, oil-impregnated sintered bronze, other metallic or non-metallic sheet stock, or other metallic or non-metallic wire stock.

Figure 14C:
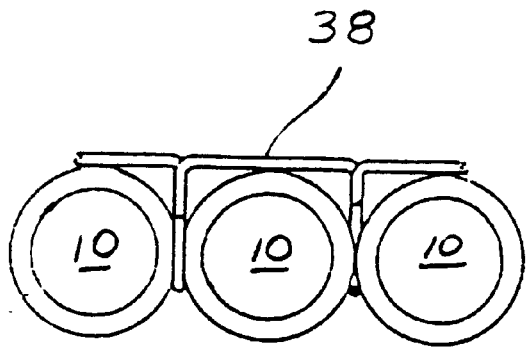
FIGS. 14b and 14c are side views of the rolling element separator of FIG. 14a with rolling elements in place.
Figure 14B:
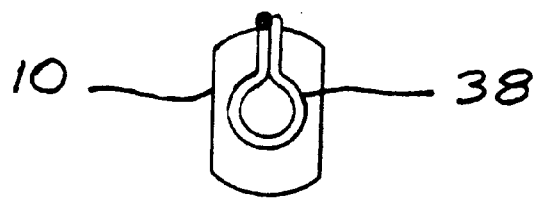
Figure 14A:
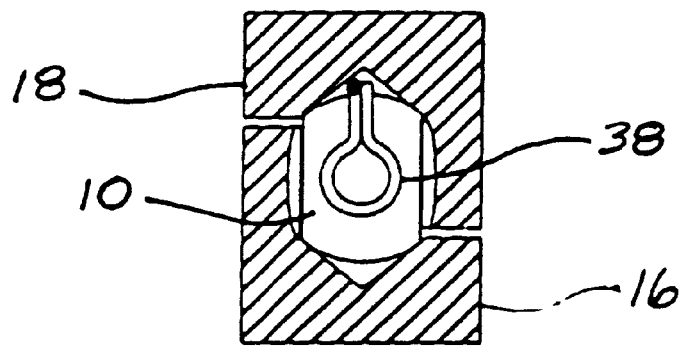
FIG. 14a is a radial cross-sectional view of a ninth embodiment of the present invention, this embodiment illustrating the use of a rolling element separator.

Yet still another embodiment illustrating the use of a rolling element separator is shown in FIGS. 14a–14c. A wire separator 38 extends along the row of aligned rolling elements 10 with wire fingers projecting between adjacent rolling elements 10. This embodiment is similar to the fingerstock separator 34 except that the elongate bar and the fingers of fingerstock separator 34 are, in the wire separator 38, made from a single length of wire. The wire travels along the row of rolling elements 10 and, between adjacent rolling elements 10, is bent down and looped back up to form the fingers projecting between the elements.

Figure 15B:
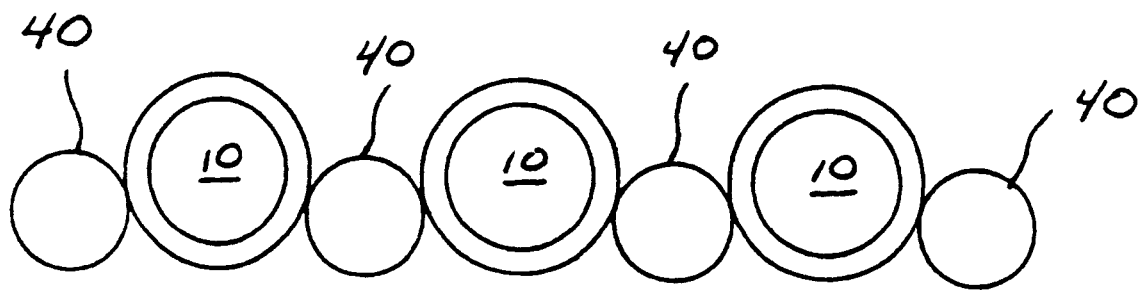
FIG. 15b is a side view of the rolling element separator of FIG. 15a with rolling elements in place.
Figure 15A:
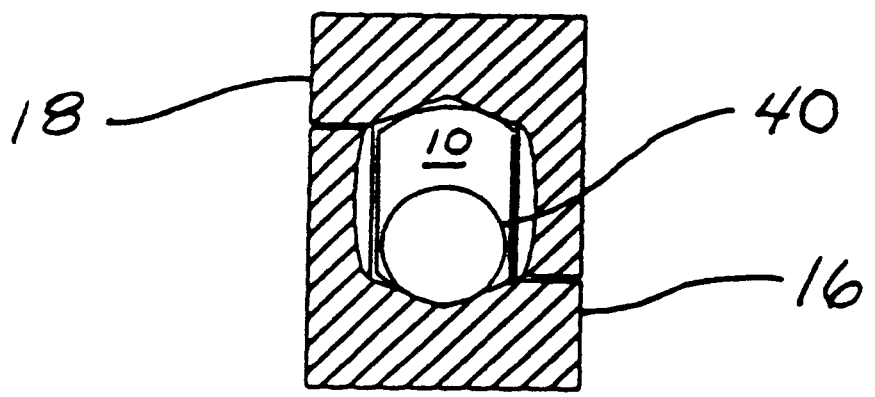
FIG. 15a is a radial cross-sectional view of a tenth embodiment of the present invention, this embodiment illustrating the use of a rolling element separator.

Even another embodiment illustrating a rolling element separator is shown in FIGS. 15a and 15b. Adjacent rolling elements 10 can be separated by a small ball separator 40. The balls of the small ball separator 40 are interstitially nestled between the adjacent rolling elements 10. The balls of the small ball separator 40 are preferably made from a material having a highly lubricative quality.

Figure 16B:
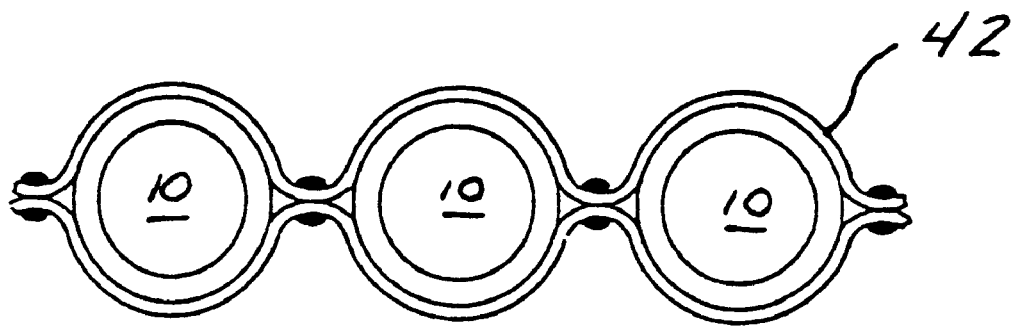
FIG. 16b is a side view of the rolling element separator of FIG. 16a with rolling elements in place.
Figure 16A:
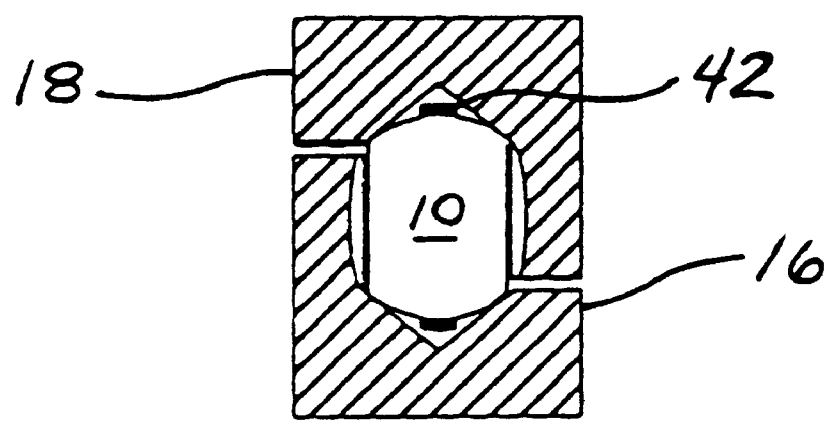
FIG. 16a is a radial cross-sectional view of an eleventh embodiment of the present invention, this embodiment illustrating the use of a rolling element separator.

A further embodiment illustrating a rolling element separator is shown in FIGS. 16a and 16b. A band separator 42 includes a thin elongate top band and a thin elongate bottom band. These bands each encircle opposite hemispheres of the rolling elements 10 and are coupled together between adjacent rolling elements 10. The top and bottom bands could be riveted (as shown in FIG. 16b), welded, or bonded together to effect the coupling. The band separator 42 could be made from a variety of materials, including nylon, teflon, oil-impregnated sintered bronze, other metallic or non-metallic sheet stock, or other metallic or non-metallic wire stock.

Figure 17:
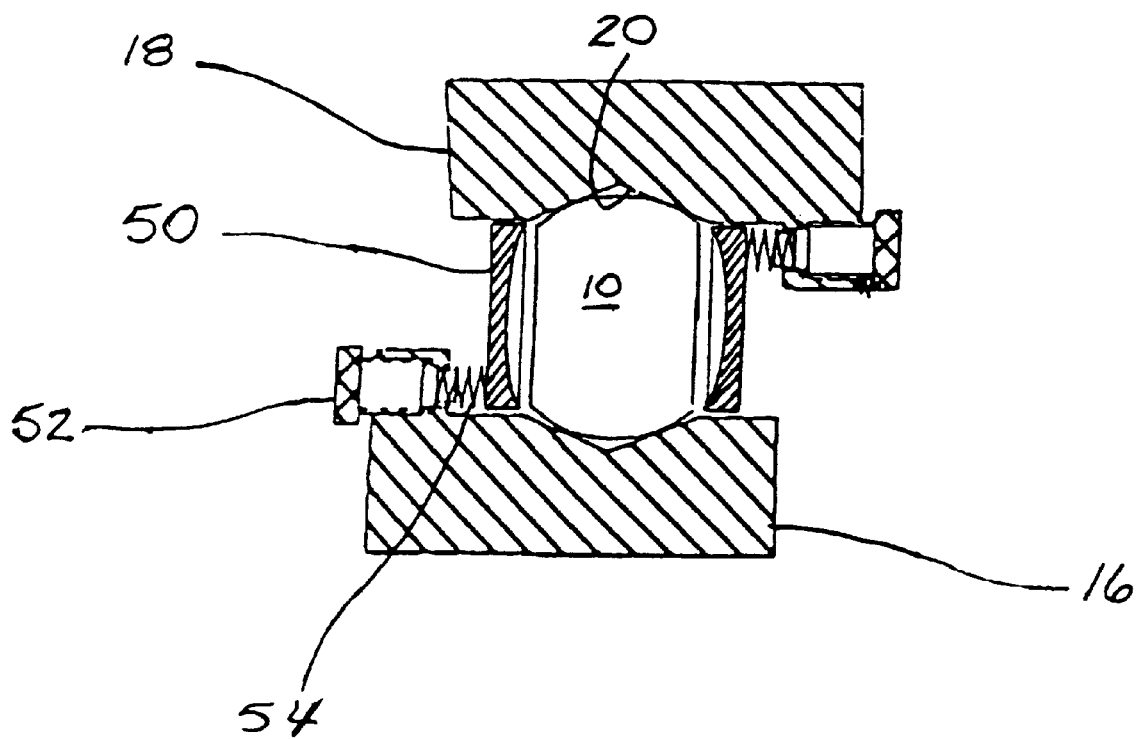
FIG. 17 is a radial cross-sectional view of a twelfth embodiment of the present invention, this embodiment illustrating the use of adjustable ratchet plates.

FIG. 17 shows an embodiment of the present invention having adjustable ratchet plates 50. These adjustable ratchet plates 50 transmit linear or rotational loads between the first race member 16 and the second race member 18 when the clutch assembly 14 is in the locked position. Adjustability of the ratchet plates 50 could be used in a variable load limiting situation. Furthermore, the adjustment mechanism could be calibrated to provide an indication of the position of the ratchet plates 50 relative to the first and second race members 16, 18. In one application, the adjustability of the ratchet plates 50 could be used to fine tune the clutch assembly 14 upon wear of the components. This tuning could be accomplished by manual adjustment or through automatic control devices. In another application, the ratchet plates 50 could be adjusted so that they audibly interfere with the rolling elements 10 in the free mode, thereby providing a sound cue.

The ratchet plates 50 are shown as movable rings having an adjustment screw 52 for moving the ratchet plates 50 toward or away from the poles of the modified bearing 10' relative to the first and second race members 16, 18. Alternatively, the ratchet plates 50 could be threaded, the first and second race members 16, 18 could have corresponding, mating threads, and the ratchet plates 50 could be adjusted by threading the ratchet plates 50 into or out of the mating threads of the race members 16, 18. Adjustability of the ratchet plates 50 could also be accomplished with cams, pneumatics, hydraulics, levers, etc. Even further, adjustability could be accomplished automatically as a function of, for instance, the loads on the rolling members or the transmitted linear or rotational loads. Finally, although FIG. 17 shows two adjustment screws, it is within the scope of the present invention to provide for the adjustment of only a single ratchet plate 50.

As illustrated in FIG. 17, the adjustable ratchet plates may be spring loaded. Adjustment springs 54 are shown as compression springs located between the adjustment screws 54 and the ratchet plates 50. These springs ensure that in an over-load situation, the ratchet plates 50 may move outward from the rolling elements 10, thereby allowing the first race member 16 to move relative to the second race member 18 when the clutch assembly 14 is in the locked position. Allowing the ratchet plates 50 to move permits controlled slippage of the clutch assembly 14 in the locked position. Furthermore, such movement may prevent damage to the clutch assembly components when too much load is applied.

Not shown in FIG. 17 is the mechanism whereby the ratchet plates 50 are kept from moving with respect to the first and second race members 16, 18. Possible mechanisms for keeping the ratchet plates 50 from rotating, include a keyway and key, the adjustment screw itself, square ratchet plates, or other such devices as are known to a person skilled in the art. It is within the scope of the present invention to use other rolling element shapes, including barrel, needle, cone, or rod, with adjustable ratchet plates. Furthermore, the clutch assembly with adjustable ratchet plates could be used for both linear motion and rotational motion applications.

Figure 18:
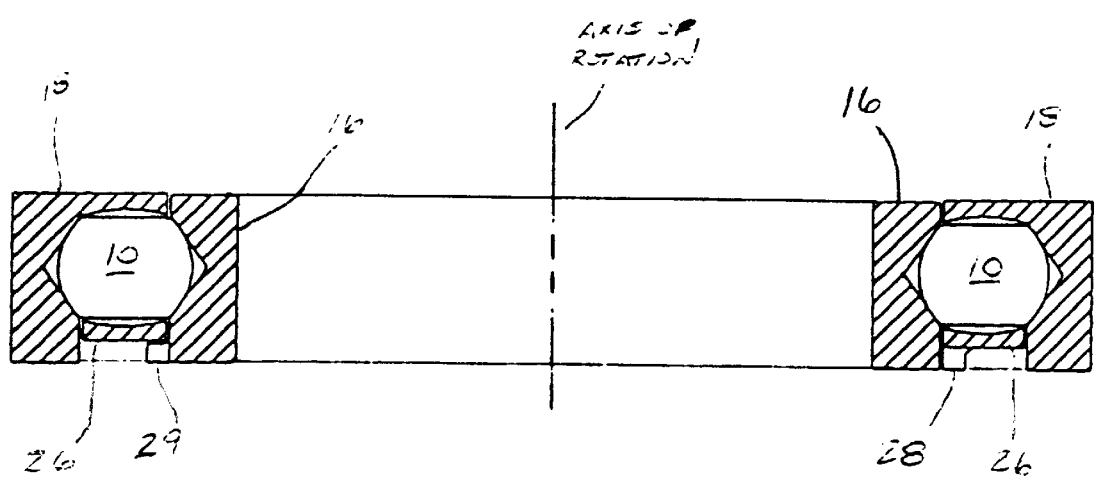
FIG. 18 is a diametrical cross-sectional view of a thirteenth embodiment of the present invention, this embodiment illustrating the use of a floating ratchet ring.

A further embodiment of the present invention, as shown in FIG. 18, allows the use of the rolling-element clutch assembly as a limited-slip clutch. The ratchet surface 22 of the second race member 18 is rigidly attached to the second race member 18. The first race member 16 includes a floating ratchet ring 26 having a projection peg 28. In the free mode, the floating ratchet ring 26 does not rotate; while in the locked up mode, the floating ratchet ring 26 does rotate. Peg 28, attached to the surface of the first race member 16 opposite the ratchet surface 22 and extending away from the rolling element 10, is integrally coupled to the floating ratchet ring 26. A corresponding projection peg 29 is attached to the wall of the first race member 16. Peg 29 interferes with peg 28 when the floating ratchet ring 26 rotates in the locked position, thereby stopping the rotation of the floating ratchet ring 26.

The amount of slip, or rotation of the floating ratchet ring 26, depends upon the placement of the projection peg 29, which is attached to the first race member 16, relative to the location of the projection peg 28, which is attached to the floating ratchet ring 26. As shown in FIG. 18, peg 28 and peg 29 will lock up after the floating ratchet ring 26 has rotated approximately 180°, at which time the clutch will engage and the first and second race members 16, 18 will become locked together. If the second race member 18 is also equipped with a similar floating ratchet ring and peg arrangement, nearly two full turns, as a maximum, could be expected prior to full lockup of the first and second race members occurs. Furthermore, multiple peg and ring combinations could give any number of rotations before lockup. Similarly, less than full rotation could be achieved by multiple pegs on the same ring or multiple pegs on the same race member. Additionally, a rotational spring (not shown) could be used to restore the floating ratchet ring 26 back to the initial position, or to lessen the slip loads.

A limited-slip clutch could be useful to prevent machine damage, for safety purposes, or for enabling desired operating characteristics. The clutch assembly 14 would slip until an intentional, predetermined amount of rotation was achieved. Such a limited-slip clutch could be used, for instance, to balance loads such as those developed while hoisting a single item with two winches, to compensate for unsymmetrical tire wear or different rates of rotation during turns in a dual wheel drive, to smooth transitions of material among multiple conveyor belts, or to allow catch-up for full traction in multi-locomotives.

Figures 19A, 19B, 19C:
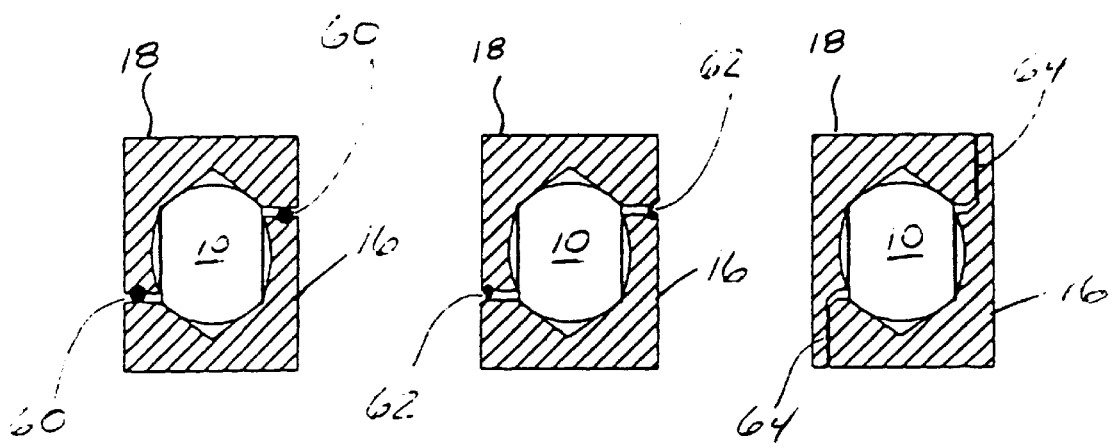
FIGS. 19a–19c are radial cross-sectional view of the first embodiment showing various seal configurations.

FIGS. 19a–19c illustrate various methods for retaining lubricant within the raceways 20 and for preventing particles and liquid contaminants, i.e., water etc., from entering the raceways 20 and thereby contaminating the rolling element surfaces. The portions of the first and second race members 16, 18 wherein the ratchet surfaces 22 are located may provide seats for sealing elements. For instance, FIG. 19a shows two O-rings 60 located between the first race member 16 and the second race member 18. FIG. 19b shows two wiper seals 62, i.e., thin, flexible flanges, attached to one of the first and second race members 16, 18 and elastically flexed against the other of the first and second race members 16, 18. These seals may be continuous or quasi-continuous. FIG. 19c shows shield seals 64, wherein the gap between the first and second race members 16, 18 is filled with a shield seal 64. The orientation of the gap between the race members can be changed to account for the loading on the clutch assembly 14. Furthermore, the shield seal 64 may be tailored for the application of the clutch assembly by making it from low friction, high load capacity, high/low temperature, etc. materials.

The above embodiments describe rolling-element clutch assemblies that include non-spherical rolling elements. However, as described below, the present invention can also operate with standard spherical ball bearings 100 as the rolling elements 10. Modified balls 10' require expensive and time consuming high precision shaping and grinding. Furthermore, in operation in the locked up mode, typically only a single modified ball 10,' or other specially shaped rolling element, would engage the ratchet surfaces. Thus, the torque capability of the clutch assembly 14 of the above-described embodiments is typically limited by the maximum load capability of the single engaged rolling element 10. In contrast, using standard ball bearings 100 eliminates the need for high precision machining, and generally, should allow all of the rolling elements to carry the applied torque, thereby increasing the torque capability of the clutch assembly 14.

Figure 20C:
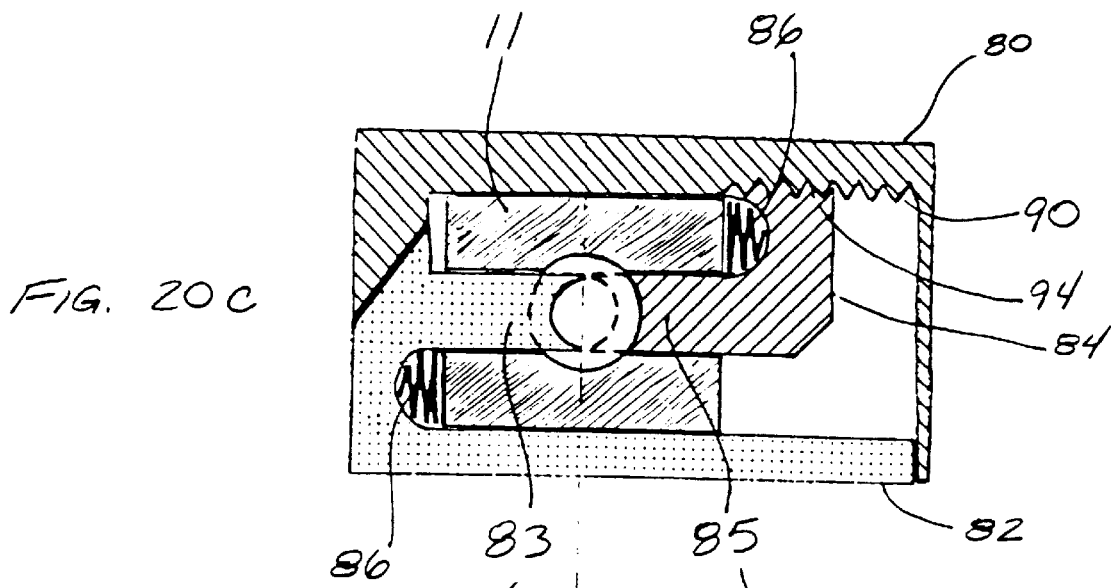
FIG. 20c is a radial cross-sectional view of the embodiment of FIG. 20a in the locked position.

FIGS. 20a and 20b illustrate an embodiment of the present invention, shown in the free mode, whereby the rolling elements are part of a standard ball bearing assembly 11. FIGS. 20c and 20b illustrate the same embodiment in the locked position. The standard ball bearing assembly 11, such as a New Hampshire Ball Bearing (NHBB)#SSRI-1458ZZSL, typically includes an inner race, an outer race and standard spherical ball bearings 100, and, in this instance, teflon tube ball bearing separators. The clutch assembly includes a first adapter member, a second adapter member, and an adjustable locking member. In the embodiment of FIGS. 20a and 20b, the clutch assembly 14 includes an second adapter member 80, an first adapter member 82, and a threaded annular ring 84 as the adjustable locking member. The first and second adapter members 82, 80 surround the standard ball bearing assembly 11. In the engaged or locked position, the threaded annular ring 84, in conjunction with the first adapter member 82, operates to grip the ball bearings 100 of the standard ball bearing assembly 11.

In the embodiment of FIGS. 20a–20d, the second adapter member 80 includes a first portion with an inwardly-sloping ramp 88 as its inner circumferential surface, a cylindrical second portion attached to the first portion, a cylindrical third portion attached to the second portion and having multi-start screw threads 90 on its inner circumferential surface, and a disk-like fourth portion attached to the third portion.

Figure 20D:
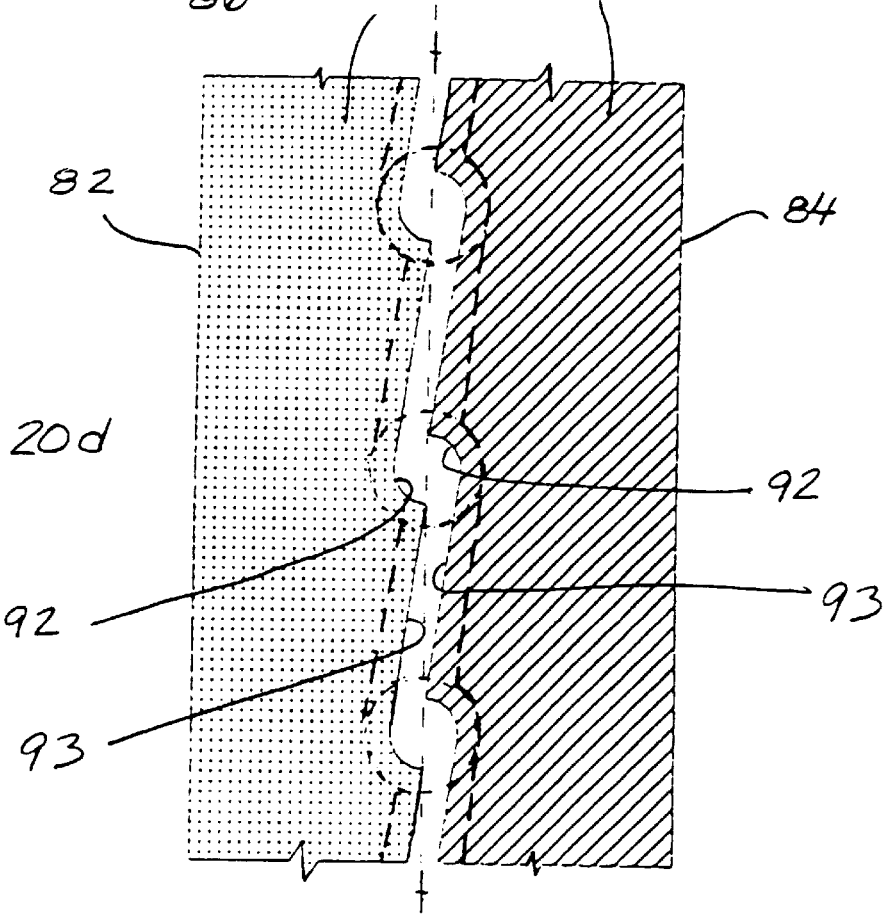
FIG. 20d is a cross-sectional side view of the first race member and annular ring of FIG. 20c, with teflon tubes not shown for clarity.

The first adapter member 82 includes an inner cylindrical portion and an outer cylindrical portion, both attached to a disk-like portion. The outer cylindrical portion of the first adapter member 82 includes a cylindrical ratchet extension 83 that a projects between the races of the bearing assembly. Further, the cylindrical ratchet extension 83 includes a series of circumferentially spaced pits or concavities 92, as best shown in FIGS. 20b and 20d, the number and spacing of the concavities 92 corresponding to the number and spacing of the ball bearings 100. Ramps 93 may be provided between the concavities 92 to assist the transition from the free mode to the full lock up position.

The threaded annular ring 84 includes an inner cylindrical portion attached to a disk-like portion. Similar to the outer cylindrical portion of the first adapter member 82, the inner cylindrical portion of the threaded annular ring 84 includes a cylindrical ratchet extension 85. And, similar to the cylindrical ratchet extension 83 of the first adapter member 82, the cylindrical ratchet extension 85 of the threaded annular ring 84 has a series of circumferentially spaced concavities 92, wherein the number and spacing of the concavities 92 correspond to the number and spacing of the ball bearings 100. The disk-like portion of the threaded annular ring 84 has multi-start screw threads 94 on its outer circumferential surface. These threads 94 complement the multi-start screw threads 90 of the second adapter member 80.

In the free mode shown in FIGS. 20a and 20b, the concavities 92 of the threaded annular ring 84 are distanced from the concavities 92 of the first adapter member 82, such that the ball bearings 100 are free to roll. The second adapter member 80 may rotate in the freely moving direction relative to the first adapter member 82. When the second adapter member 80 is rotated in the opposite direction relative to the first adapter member 82, the threads 94 of the threaded annular ring 84 engage the multi-start threads 90 of the second adapter member 80 and the annular ring 84 travels axially towards the ball bearings 100. The amount of axial motion of the annular ring 84, between a fully locked-up engagement and a free mode, is a maximum of one ball diameter. In the locked position shown in FIGS. 20c and 20d, the concavities 92 of the annular ring 84 and the concavities 92 of the first adapter member 82 mate with either side of the ball bearings 100, thereby locking the ball bearings 100 in place. The associated dimensions of the ball bearings 100 and of the concavities 92 are fully complementary so that the ball bearings 100 fully engage the concavities 92. Because the load applied to the clutch assembly 14 is carried by all of the ball bearings 100, the non-annular portions of the first and second adapter members 82, 80 may be of light construction and materials compared to the annular ring 84.

The standard ball bearing assembly 11 is slip-fit into the clutch assembly 14. Thus, the ball bearing assembly floats within the clutch assembly 14 and only one annular ring 84 is necessary for effecting the lockup mode. If the standard ball bearing assembly 11 has different ball bearing separators from those shown, the concavities 92 and ramps 93 may include an accommodating groove.

Several modifications to this basic embodiment may be preferred to maximize the performance. For instance, as shown in FIGS. 20a–20d, circumferential springs 86 between the standard ball bearing assembly 11 and the first and second adapter members 82, 80 could encourage the annular ring 84 to move axially away from the ball bearings 100. The annular ring 84 may be spring-loaded or coupled to the clutch assembly 14 in such a manner that in an over-torque situation the annular rings 84 could slip, thus limiting the torque transmitted by the clutch assembly 14. Additionally, the multi-start screw threads may be single start screw threads, cams or even ball and ramp mechanisms. Furthermore, the ball bearing assembly 11 need not be a standard, off-the-shelf bearing, but could be custom designed and manufactured. The rolling elements need not be spherical ball bearings, nor need they be separated.

In this embodiment, no actual ratcheting takes place. Thus, if an audible cue is needed for an indication of being in the free mode, or if ratcheting is desired for other reasons, a spring mechanism or axial tensioning device could be added. Alternatively, ratcheting behavior could be encouraged by shaping the annular ring 84 to elastically suspend the ramps. Additionally, the direction of free movement and lock up could be placed under the operator's control or under automatic control via devices such as reversible slant ramps, reversible screw threading, or other reversible mechanisms. Finally, it is within the scope of the present invention to use this embodiment for rotary, linear, and non-linear motions.

Figure 21A:
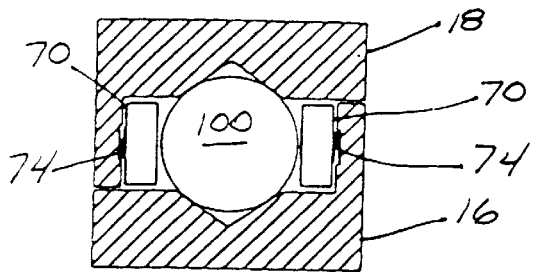
FIG. 21a is a radial cross-sectional view of a fifteenth embodiment of the present invention, this embodiment illustrating the use of spherical rolling elements and spring-loaded pawls.
Figure 21E:
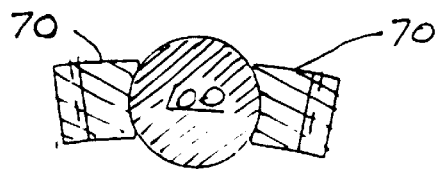
FIG. 21e is a view taken along the line 21e—21e of FIG. 21c of a ball bearing and pawls in a locked position.

FIGS. 2aa–2ae illustrate another embodiment of the present invention that uses standard spherical ball bearings for the rolling elements. As shown in FIGS. 21ab and 21ad, the first and second race members 16, 18 include a plurality of spring-loaded pawls 70 for engaging the ball bearings 100. The pawls 70 may include small block-like elements pivotably coupled to the race members 16, 18, and located within individual cavities 72 circumferentially spaced along the raceways 20 of the race members 16, 18. The edges of the pawls 70 opposite the pivots may be shaped to complement the spherical surface of the ball bearings 100. Springs 74 between the pawls 70 and the first or second race members 16, 18 bias the pawls 70 away from the cavities 72, thereby causing the pawls 70 to extend into the raceway 20.

Figure 21B:
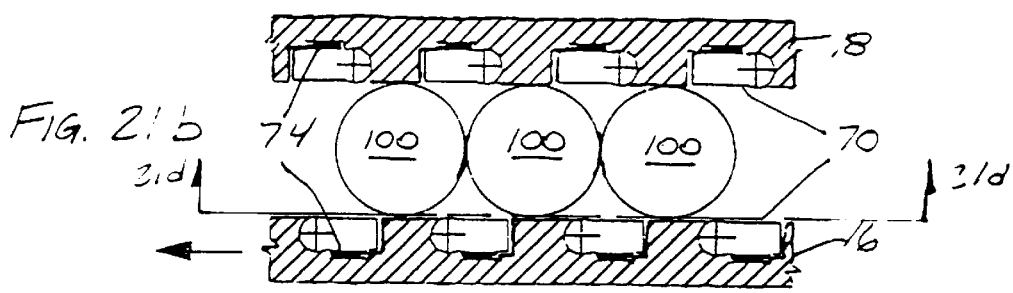
FIGS. 21b and 21c are cross-sectional side views of the embodiment of FIG. 21a in a free mode and locked position, respectively.
Figure 21C:
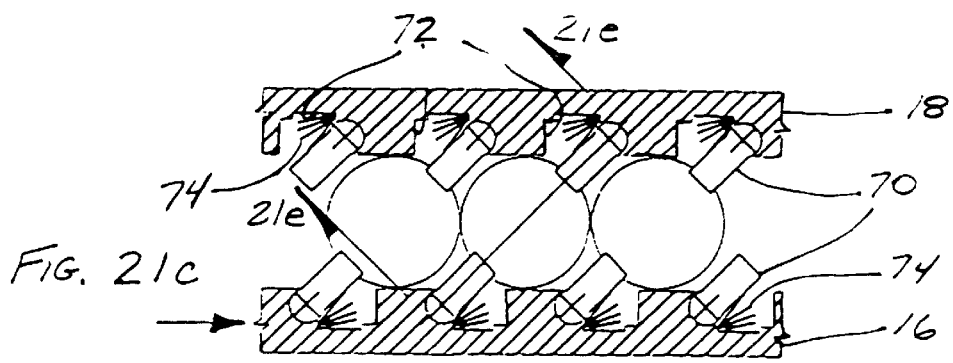

In the free mode, as best shown in FIG. 21b, as the first and second race members 16, 18 move relative to the ball bearings 100, each pawl 70 is pressed into its corresponding cavity 72, thereby compressing the spring 74. As the ball bearings 100 roll by, each pawl 70 is forced to lie flush, or approximately flush, with the first surface of the race members 16, 18. Furthermore, in the free mode, as the ball bearings 100 slide past the pawls 70 clicking may be heard.

Figure 21D:
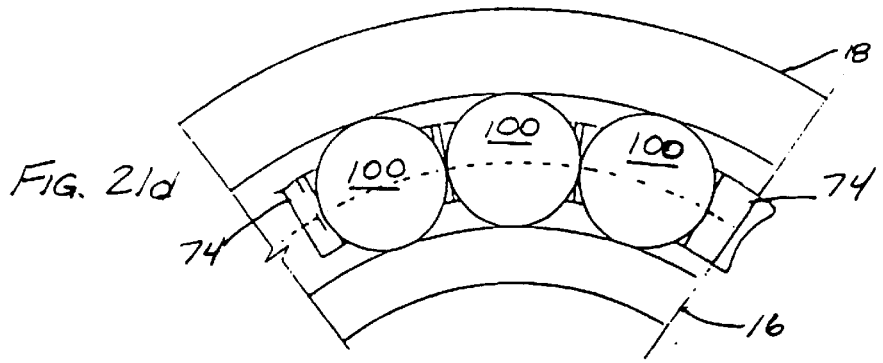
FIG. 21d is a view taken along the line 21d—21d of FIG. 21b.

In the locked mode, as best shown in FIG. 21*d*, the edge of the pawl 70 opposite the pivot extends into the raceway 20 and interferes with the passage of the ball bearings 100. Depending upon the number and design of the pawls 70, very little backward rotation of the race members may be necessary to fully engage the ball bearings 100 with the pawls 70. Furthermore, if the number of pawls 70 is a whole number multiple of the number of ball bearings 100, and if the ball bearings 100 are equally spaced, all of the ball bearings 100 may be engaged in the locked position simultaneously. Simultaneous action of the pawls 70 may be ensured by linking the pawls 70 together (not shown). As shown in FIG. 21*d*, the pawls 70 pivot on axes that are perpendicular to the axes of rotation of the first and second race members 16, 18, and therefore, movement of the pawls 70 should not be effected by centrifugal forces.

This embodiment could also function with rolling elements that are non-spherically shaped, including, among others, cylindrical, needle, and tapered rolling elements. Furthermore, the pawls could be activated by automatic or manual devices other than springs, and the direction of engagement of the pawls could be under user control. As with the previous embodiment, this embodiment need not be based on rotary motion, but could function with linear or freeform motion such as conveyors and roller coasters.

Figure 22A:
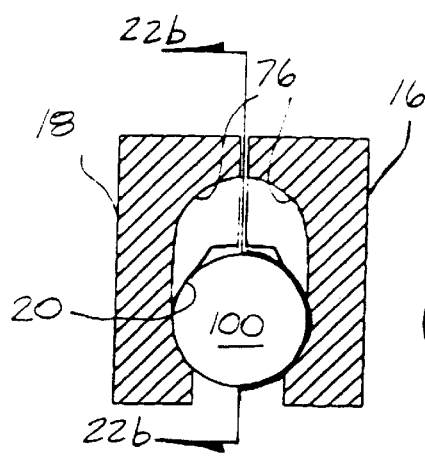
FIGS. 22a and 22b are a radial cross-sectional view and a view taken along the line 22b—22b of FIG. 22a, respectively, of a sixteenth embodiment of the present invention in a free mode, this embodiment illustrating the use of spherical rolling elements and angled concavities.
Figure 22B:
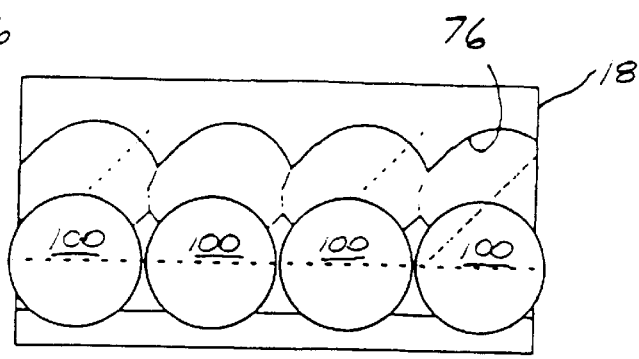
Figure 22C:
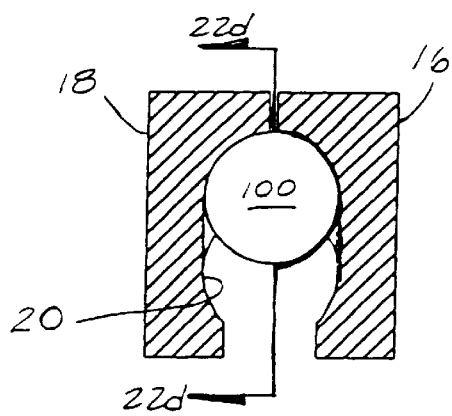
FIGS. 22c and 22d are a radial cross-sectional view and a view taken along the line 22d—22d of FIG. 22c, respectively, of the embodiment of FIG. 22a in a locked position.
Figure 22D:
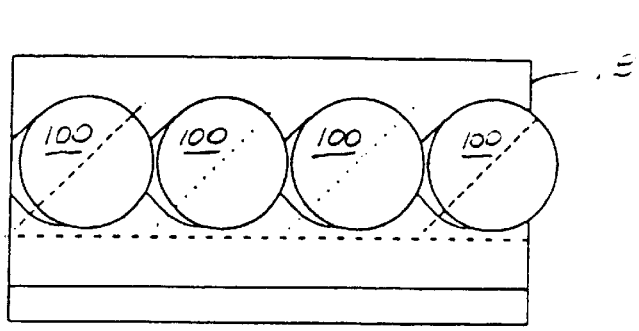

FIGS. 22*a*–22*d* illustrate yet another embodiment of the present invention that uses standard spherical ball bearings for the rolling elements. As best shown in FIGS. 22*a* and 22*b*, both the first and the second race members 16, 18 include a plurality of angled concavities 76 cut into the surface of the raceway 20 and located to the side of the raceway 20. When a concavity 76 from the first race member 16 is opposite a concavity 76 from the second race member 18, a passageway for the ball bearing 100 is formed. This passageway is positioned at an acute angle from the axis of the raceway 20.

In the free mode, as shown in FIGS. 22*a* and 22*b*, the ball bearings 100 travel in the raceway 20 adjacent to the concavities 76. When the first and second race members 16, 18 are rotated with respect to one another in the free direction, the ball bearings 100 glide past the angled concavities 76, because these concavities 76 are acutely angled in the direction opposite to the travel of the ball bearings 100. When the race members 16, 18 are rotated in the locked direction, the ball bearings 100, not being theoretically perfectly spherical, may wobble slightly, thereby randomly following other paths if not constrained. Alternatively, a preload or slight interference fit would also encourage the ball bearings 100 leave the raceway 20 and start to travel down a concavity 76. When at least one ball bearing 100 starts to travel down a concavity 76 on one race member, the other race member will quickly become aligned with the first race member, thus allowing the formation of a passageway formed by a pair of concavities 76. The ball bearing 100 is captured by and within the passageway formed by the pair of concavities 76 between the first and second race members 16, 18, thereby locking the race members together.

If the number of angled passageways, formed by pairs of concavities 76, is a whole number multiple of the number of ball bearings 100, and if the ball bearings 100 are equally spaced, the ball bearings 100 may all be engaged in the locked position simultaneously. This simultaneous lock up can be facilitated by organizing the ball bearings 100 with a ball retainer or separator.

Figure 22E:
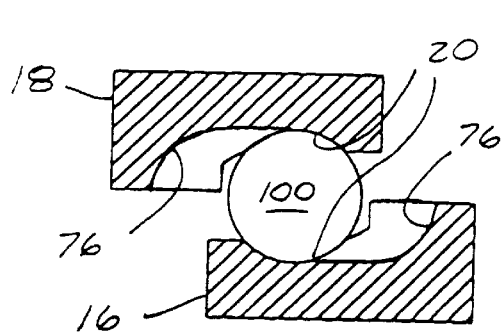
FIGS. 22e and 22f are radial cross-sectional views of a modification to the embodiment of FIG. 22a in the free mode and locked position, respectively.
Figure 22F:
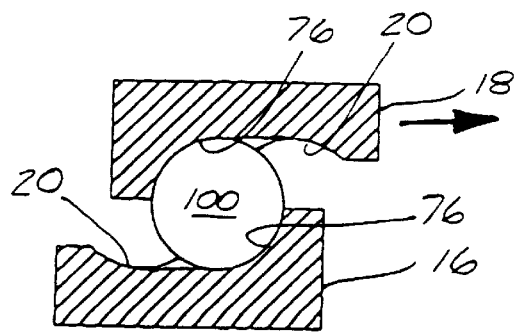

A modification to the embodiment of FIGS. 22*a*–22*d* is illustrated in FIGS. 22*e* and 22*f*. The angled concavities 76 of the first race member 16 are located on one side of the raceway 20 and the angled concavities 76 of the second race member 18 are located on the opposite side of the raceway 20. A slight movement of the first race member 16 relative to the second race member 18 in a direction perpendicular to the direction that the ball bearings 100 travel, as shown in FIG. 22*f*, causes the race members to become locked. The advantage of this modification is that all of the ball bearings 100 would become locked simultaneously, thereby ensuring maximum torque carrying capability of the clutch assembly 14.

As with the previous embodiment, this embodiment could function with rolling elements that are non-spherically shaped, including, among others, cylindrical, needle, and tapered rolling elements, and the clutch assembly itself need not be based on rotary motion, but could function with linear or freeform motion such as conveyors and roller coasters.

Figure 23A:
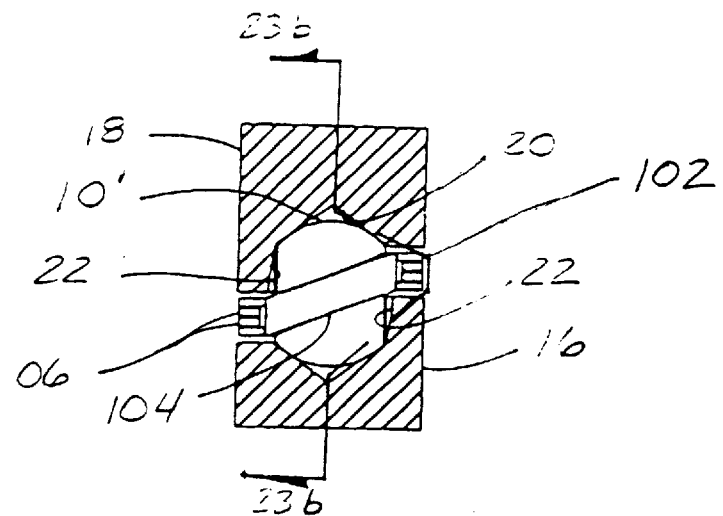
FIGS. 23a and 23b are a radial cross-sectional view and a view taken along the line 23b—23b of FIG. 23a, respectively, of a seventeenth embodiment of the present invention in the free mode, this embodiment illustrating the use of a linking rolling element separator.
Figure 23B:
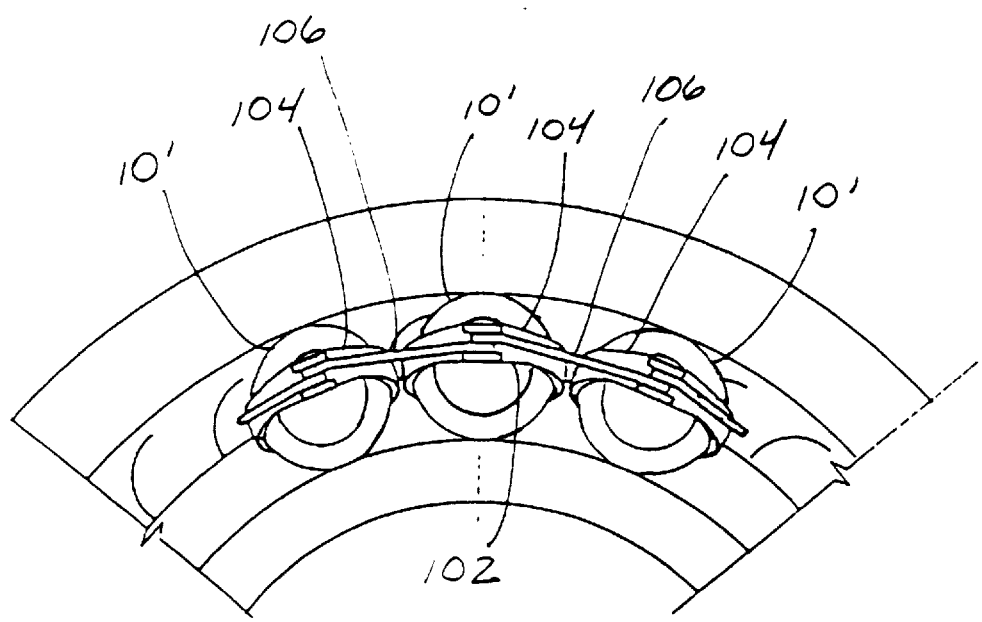

FIGS. 23*a* and 23*b* illustrate still another embodiment of the present invention that ensures that all of the rolling elements 10 substantially simultaneously engage the ratchet surfaces 22 in the locked position, thus enabling the rolling-element clutch assembly 14 to transmit higher loads than if only one or a few of the rolling elements 10 are engaged. This substantially simultaneously engagement of the rolling elements 10 is accomplished by a linking rolling element separator 102. Linking rolling element separator 102 links the rolling elements 10 so that when one rolling element 10 pivots upon engagement with the ratchet surfaces 22 all of the rolling elements 10 pivot. In the present embodiment, the linking rolling element separator 102 is shown as a series of separator bands 104 encircling each modified ball bearing 10', each separator band 104 linked to its neighboring separator band 104 by a pair of linking elements 106. The separator bands 104 encircle each modified ball bearing 10' so as allow the modified ball bearing to freely roll. As best shown in FIG. 23*a*, the separator bands 104 encircle the surfaces of the rolling elements 10 that engage the ratchet surfaces 22, i.e., the flattened poles of the ball bearings 10'. Pairs of linking elements 106 are attached on opposite sides of the separator bands 104. The first end of a linking element 106 is attached to a first separator band 104 and the second end of the linking element 106 is attached to an adjacent separator band 104. The ratchet surfaces 22 may be less than full height ratchet surfaces, as previously describe, to provide a channel in which the linking elements 106 may travel.

In the free mode, each modified ball bearing 10' freely rolls within the separator band 104 and the rolling element separator 102 with the modified ball bearings 10' travels within the raceway 20. In the transition between the free mode and the lock up position, a first modified ball bearing 10' starts to pivot and engage the ratchet surfaces 22. The pivoting of the first modified ball bearing 10' causes the separator band 104 encircling it to also start to pivot, thereby causing the other separator bands 104 which are all linked together by the linking elements 106 and the other modified ball bearings 10' within the other separator bands 104 to likewise pivot. In this manner, substantially simultaneous engagement of the rolling elements 10 with the ratchet surfaces 22 is accomplished. Furthermore, the linking rolling element separator 102 may be spring-loaded to encourage engagement during the transition from the free mode to the locked up position. Also the links may be a continuous, circumferential band rather than individual links. The springs could be carried around each pivot attachment such that, when relaxed the springs tend to hold the modified balls at an angle to the direction of rotation. This would cause audible clicking. Alternatively, the separator and linking band might be made from a single piece, perhaps molded of a material having high resilience and lubricative qualities, such that the engaged, fully pivoted positions are the as-made configuration.

In general, the linking rolling element separator 102 must be closely toleranced. A close tolerance between the separator bands 104 and the rolling elements 10 must be maintained, and the stack up of the tolerances of the linking elements 106 must be limited. Such tolerances would typically be on the order of ±0.01 mm. The linking elements 106 need not be paired on opposite sides of the separator bands 104. Other configurations of the linking elements 106 include locating all of the linking elements 106 on the same side of the separator bands 104 or alternating the linking elements 106 on either side of the separator bands 104. The number of ratchet inclines must be a whole number multiple of the number of rolling elements 10 so that there is a ratchet incline available for each of the rolling elements 10 when the clutch assembly 14 is in the engaged or locked up position.

Figure 24A:
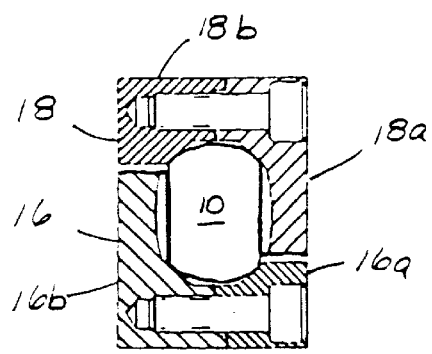
FIGS. 24a and 24b are radial cross-sectional views of an eighteenth embodiment of the present invention in a free mode, this embodiment illustrating split race members.
Figure 24B:
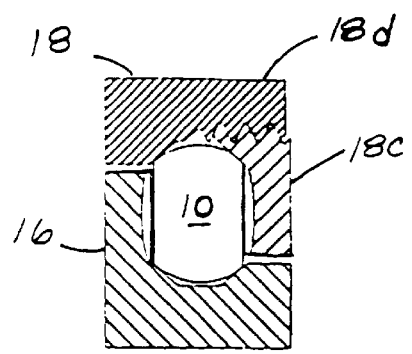

Several different methods for fabricating and assembling the embodiments of the present invention are provided. FIGS. 24a and 24b illustrate split race members. As shown in FIG. 24a, for ease of fabrication and assembly, race member 16 could be manufactured in two race member portions 16a, 16b, wherein the race surface of race member 16 is provided by combining the race surfaces of race member portions 16a and 16b. Similarly, race member 18 could be manufactured in two race member portions 18a, 18b, wherein the race surface of race member 18 is provided by combining the race surfaces of race member portions 18a and 18b. Race member portions 16a, 16b, and race member portions 18a, 18b, could be fastened together with screws or other suitable means. For instance the race member portions could be press fit, brazed, or bonded together or a conformal wrap, such as that made from a ductile metal, could be used to fasten the race member portions together. Alternatively, as shown in FIG. 24b, for concentric race members 16, 18, race member 16 could be manufactured as a single member and race member 18 could be manufactured in two race member portions 18c, 18d having complementary threads. To assemble race member 18, race member portion 18c would be threaded onto race member portion 18d.

Figure 25A:
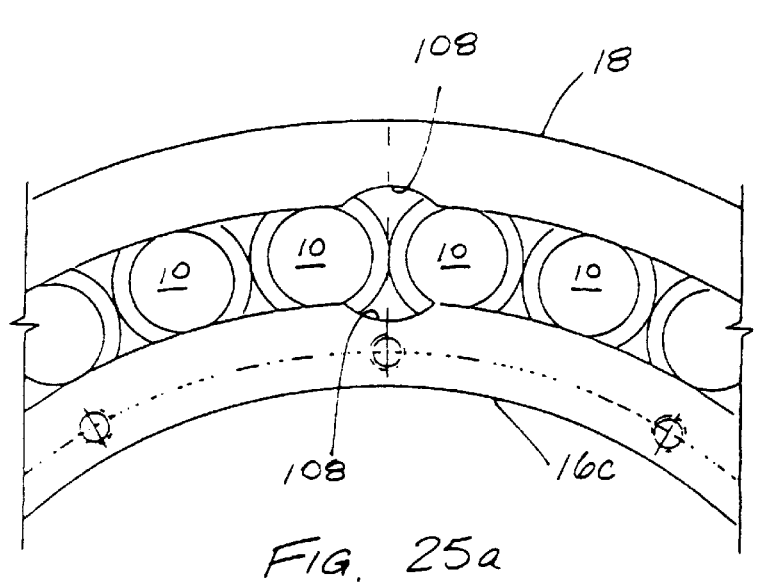
FIGS. 25a and 25b are a top view with the ratchet plate removed and a radial cross-sectional view of a nineteenth embodiment of the present invention in a free mode, this embodiment illustrating the rolling element fill notch.
Figure 25B:
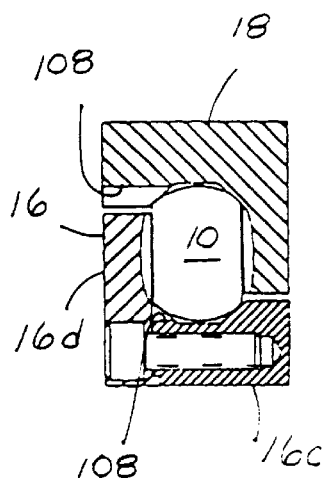

FIGS. 25a and 25b illustrate the present invention with rolling element fill notches or slots. In this embodiment, the race member 16 could be manufactured in two race member portions 16c, 16d. Race member portion 16d could be a removable ratchet plate. A subassembly composed of the race member 18 and the race member portion 16c would form a partially exposed raceway 20, wherein the rolling elements 10 would be retained between the race members 18, 16c. For ease of assembling the rolling elements 10 into the raceway 20, the rolling element fill notches 108 may be provided on opposing faces of the race member 18 and the race member portion 16c. The rolling elements 10 could be inserted into the raceway 20, formed between the race member 18 and the race member portion 16c, through rolling element fill notches 108. The rolling element fill notches 108 would typically complement the shape of the rolling elements 10. As shown in FIG. 25a, rolling element fill notches 108 may be circular arcs for complementing modified ball bearings. The race member portion 16d may then be fastened to the race member portion 16c using a screw or other suitable fastener. The rolling element fill notches 108 could be filled or plugged, if necessary, to provide a smooth interior raceway surface for the rolling elements 10.

Figure 26:
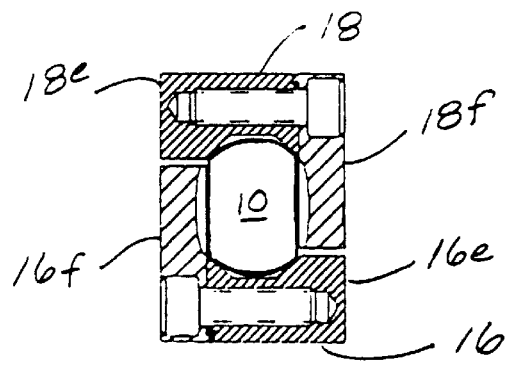
FIG. 26 is a radial cross-sectional view of a twentieth embodiment of the present invention in a free mode.

FIG. 26 illustrates the present invention with removable ratchet plates. In this embodiment, race members 16, 18 include race surface portions 16e, 18e, respectively, and ratchet plate portions 16f, 18f, respectively. The ratchet plate portions 16f, 18f are removable fastened to race surface portions 16e, 18e, respectively, with screws or other suitable fasteners.

The embodiments illustrated in FIGS. 24a–26 may be used in conjunction with many of the embodiments described above to simplify the fabrication and assembly of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A rolling-element clutch assembly, comprising:
   a first race member defining a first race surface having a first ratchet surface portion;
   a second race member defining a second race surface having a second ratchet surface portion, the first race surface and the second race surface defining a raceway therebetween;
   a plurality of rolling elements disposed in the raceway, the rolling elements providing rolling support between the first race member and the second race member when the first race member moves in a first direction relative to the second race member, and at least one of the plurality of rolling elements engaging the first and second ratchet surface portions when the first race member moves in a second direction relative to the second race member, thereby impeding relative motion between the first race member and the second race member and providing load transmission capability; and
   the first ratchet surface being spring loaded and being adjustably coupled to the first race member.

2. The clutch assembly of claim 1, wherein the second ratchet surface is adjustably coupled to the second race member.

3. The clutch assembly of claim 1, wherein the first ratchet surface portion includes a plurality of inclines extending along the first ratchet surface portion in the first direction, each incline embedded into the first ratchet surface portion and having a profile adapted for engaging one of the plurality of rolling elements.

4. The clutch assembly of claim 1 wherein the second ratchet surface is spring loaded.

5. A rolling-element clutch assembly, comprising:
   a first race member defining a first race surface having a first ratchet surface portion;
   a second race member defining a second race surface having a second ratchet surface portion, the first race surface and the second race surface defining a raceway therebetween;

a plurality of rolling elements disposed in the raceway, the rolling elements providing rolling support between the first race member and the second race member when the first race member moves in a first direction relative to the second race member, and at least one of the plurality of rolling elements engaging the first and second ratchet surface portions when the first race member moves in a second direction relative to the second race member, thereby impeding relative motion between the first race member and the second race member and providing load transmission capability;

the first ratchet surface being adjustably coupled to the first race member; and the second ratchet surface being adjustably coupled to the second race member.

6. The clutch assembly of claim 5 wherein the first ratchet surface portion includes a plurality of inclines extending along the first ratchet surface portion in the first direction, each incline embedded into the first ratchet surface portion and having a profile adapted for engaging one of the plurality of rolling elements.

7. The clutch assembly of claim 5 wherein the first ratchet surface is spring loaded.

8. The clutch assembly of claim 7 wherein the second ratchet surface is spring loaded.

* * * * *